(12) United States Patent
Aktas et al.

(10) Patent No.: US 11,332,042 B2
(45) Date of Patent: May 17, 2022

(54) SEATING ASSEMBLY

(71) Applicant: Ford Global Technologies, LLC, Dearborn, MI (US)

(72) Inventors: Macit Aktas, Windsor (CA); Spencer Robert Hoernke, Dundas (CA); Paul D. Peterson, Imlay City, MI (US); Johnathan Andrew Line, Northville, MI (US); Joseph Michael Kish, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 360 days.

(21) Appl. No.: 16/704,118

(22) Filed: Dec. 5, 2019

(65) Prior Publication Data

US 2021/0170916 A1 Jun. 10, 2021

(51) Int. Cl.
*B60N 2/015* (2006.01)
*B60N 2/30* (2006.01)
*B60N 2/20* (2006.01)

(52) U.S. Cl.
CPC ........ *B60N 2/01583* (2013.01); *B60N 2/3011* (2013.01); *B60N 2/01591* (2013.01); *B60N 2/206* (2013.01); *B60N 2/305* (2013.01); *B60N 2205/35* (2013.01)

(58) Field of Classification Search
CPC .... B60N 2/01583; B60N 2/12; B60N 2/3011; B60N 2/085; B60N 2/10; B60N 2/919; B60N 2002/0216
USPC .................. 296/65.03, 65.05; 297/325, 326, 297/334–336
See application file for complete search history.

(56) References Cited

U.S. PATENT DOCUMENTS

| 4,884,843 | A | * | 12/1989 | DeRees | B60N 2/045 297/331 |
| 5,662,368 | A | * | 9/1997 | Ito | B60N 2/01583 296/65.05 |
| 6,375,246 | B1 | * | 4/2002 | Nicola | B60N 2/01583 296/65.03 |
| 6,793,285 | B1 | * | 9/2004 | Tame | B60N 2/3011 297/336 |
| 7,090,277 | B2 | * | 8/2006 | Andrigo | B60N 2/933 296/65.08 |
| 8,016,354 | B2 | | 9/2011 | Veluswamy et al. | |
| 9,827,879 | B2 | | 11/2017 | Fujita et al. | |
| 2004/0251705 | A1 | * | 12/2004 | Tame | B60N 2/3011 296/65.09 |

(Continued)

*Primary Examiner* — Jason S Morrow
*Assistant Examiner* — Wenwei Zhuo
(74) *Attorney, Agent, or Firm* — Vichit Chea; Price Heneveld LLP

(57) ABSTRACT

A vehicle seating assembly comprises a lift mechanism disposed at a forward portion of a seat and a latch assembly disposed at a rearward portion of the seat and rotatably coupled to the seat. A mechanical link has a first end rotatably coupled to the forward portion of the seat and a second end rotatably coupled to the latch assembly. The vehicle seating assembly is movable between a first position and a second position, wherein the latch assembly is positionable in a latched position or an unlatched position relative to a mount assembly. The mechanical link is disposed in an initial position when the seating assembly is in the first position, and the mechanical link is disposed in a final position when the seating assembly is in the second position.

13 Claims, 29 Drawing Sheets

(56) References Cited

U.S. PATENT DOCUMENTS

| | | | |
|---|---|---|---|
| 2005/0077770 A1* | 4/2005 | Lang | B60N 2/36 297/331 |
| 2006/0113828 A1* | 6/2006 | Ryan | B60N 2/309 297/336 |
| 2006/0131946 A1 | 6/2006 | Andrigo et al. | |
| 2007/0080555 A1* | 4/2007 | Lutzka | B60N 2/305 296/65.03 |
| 2008/0224520 A1* | 9/2008 | Veluswamy | B60N 2/309 297/335 |
| 2009/0230744 A1* | 9/2009 | Szybisty | B60N 2/309 297/335 |
| 2009/0273211 A1* | 11/2009 | Hancock | B60N 2/3018 297/13 |
| 2010/0052389 A1* | 3/2010 | Holdampf | B60N 2/309 297/316 |
| 2011/0006574 A1* | 1/2011 | Carroll | B60N 2/3065 297/316 |
| 2011/0221239 A1* | 9/2011 | Holdampf | B60N 2/2356 297/61 |
| 2012/0242105 A1* | 9/2012 | Haeske | B60N 2/01583 296/65.03 |
| 2015/0069808 A1* | 3/2015 | White | B60N 2/3075 297/354.12 |

\* cited by examiner

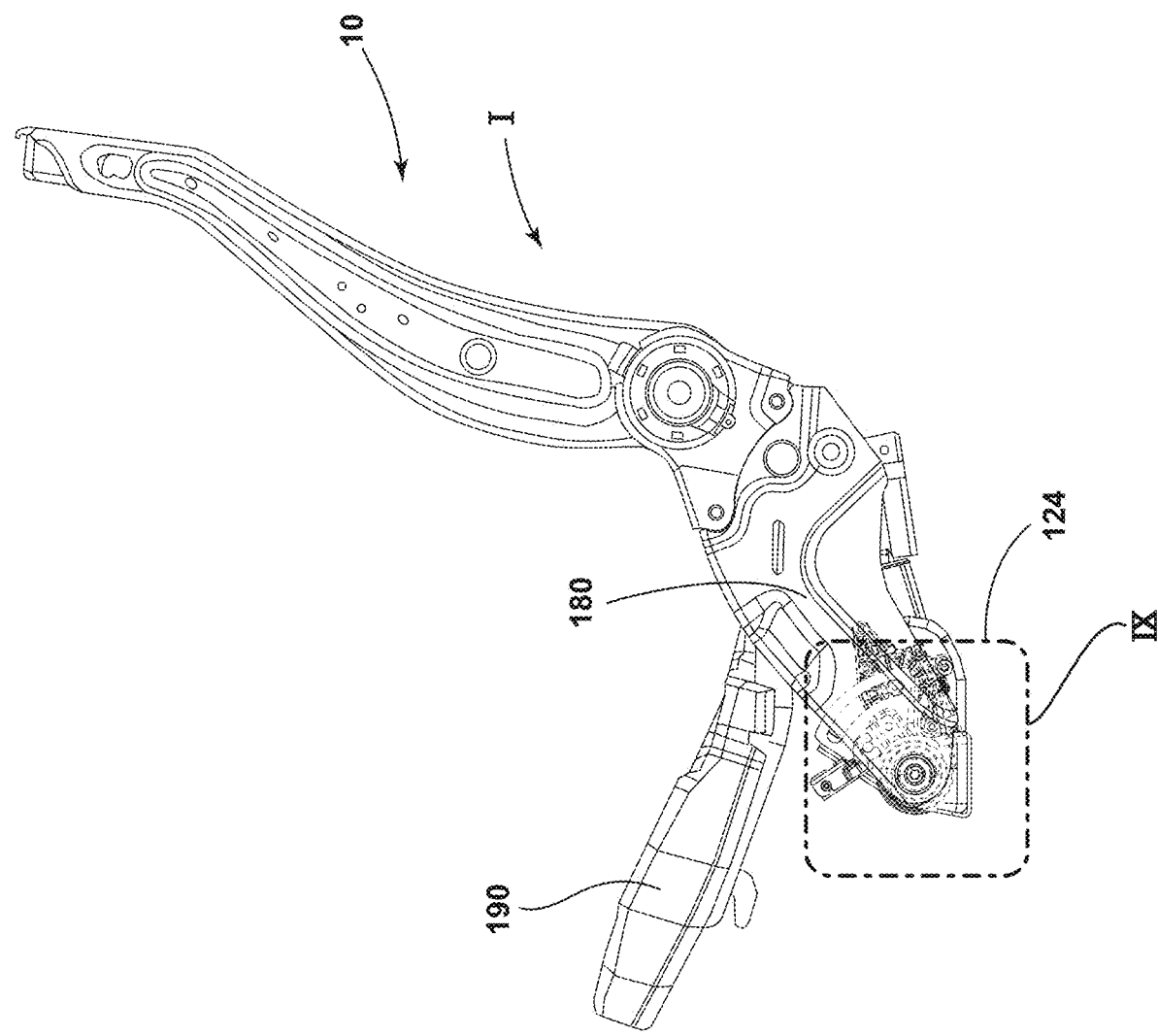

SEATING ASSEMBLY

FIELD OF THE DISCLOSURE

The present disclosure generally relates to a vehicle seating assembly, and more specifically to a vehicle seating assembly that may be arranged in different positions.

BACKGROUND OF THE DISCLOSURE

A vehicle seating assembly may have features that allow the vehicle seating assembly to be arranged in different positions.

SUMMARY OF THE DISCLOSURE

According to one aspect of the present disclosure, a vehicle seating assembly comprises a lift mechanism disposed at a forward portion of a seat and a latch assembly disposed at a rearward portion of the seat and rotatably coupled to the seat. A mechanical link has a first end rotatably coupled to the forward portion of the seat and a second end rotatably coupled to the latch assembly. The vehicle seating assembly is movable between a first position and a second position, wherein the latch assembly is positionable in a latched position or an unlatched position relative to a mount assembly. The mechanical link is disposed in an initial position when the seating assembly is in the first position, and the mechanical link is disposed in a final position when the seating assembly is in the second position.

Embodiments of the first aspect of the disclosure can include any one or a combination of the following features:
  the first end of the mechanical link is rotatably coupled to an elongated member extending across the forward portion of the seat;
  the elongated member extends between opposing mounting brackets disposed on a base of the vehicle seating assembly;
  the lift mechanism is coupled to a mounting bracket;
  the first end of the mechanical link is coupled to a linkage that is rotatably coupled to the elongated member;
  the seat comprises a side bracket, wherein the latch assembly is rotatably coupled to the side bracket;
  the second end of the link is rotatably coupled to the latch assembly;
  the first position includes a sitting position, and the second position includes a standing position;
  when the vehicle seating assembly is in the sitting position, the initial position of the mechanical link may be defined by the link extending along the base;
  when the vehicle seating assembly is in the standing position, the final position of the mechanical link may be defined by the link extending away from the base;
  the mounting assembly includes a striker; and
  the latch assembly includes a latching claw.

According to a second aspect of the present disclosure, a link for a vehicle seating assembly comprises a first end rotatably coupled to a first axis extending through a side bracket of a seat proximate a forward portion of the seat, and a second end rotatably coupled to a second axis extending through a latch assembly proximate a rear portion of the seat, wherein the link moves the latch assembly from an untucked position to a tucked position as the seat moves from a respective sitting position to a standing position.

Embodiments of the second aspect of the disclosure can include any one or a combination of the following features:

in the untucked position, the latch assembly is substantially transverse to the side bracket, wherein in the tucked position, the latch assembly is disposed along the side bracket;
  the first axis includes a lift mechanism axis;
  the second axis is defined by a pivotable coupling between the latch assembly and the side bracket;
  a linkage is rotatable about an elongated member extending from the lift mechanism along the first axis, wherein the first end of the link is pivotably coupled to the linkage;
  the latch assembly includes a pivotable coupling, wherein the second end of the link is pivotably coupled to the pivotable coupling on the latch assembly; and
  the link is curved such that the first end is inward towards the seat of the second end.

According to a third aspect of the present disclosure, a link for a vehicle seating assembly comprises a first end rotatably coupled to a lift mechanism disposed at a forward portion of a seat and a second end rotatably coupled to a latch assembly disposed at a rear portion of the seat. The lift mechanism is pivotably coupled to a mounting bracket that is fixedly coupled to a base, wherein the latch assembly is rotatably coupled to a side bracket of the seat, and the link rotates the latch assembly from an untucked position when the seat is in the sitting position to a tucked position when the seat is in the standing position.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 8 is a left side elevational view of a seating assembly frame and a seat pan in a sitting position;

DETAILED DESCRIPTION

Figure 1:
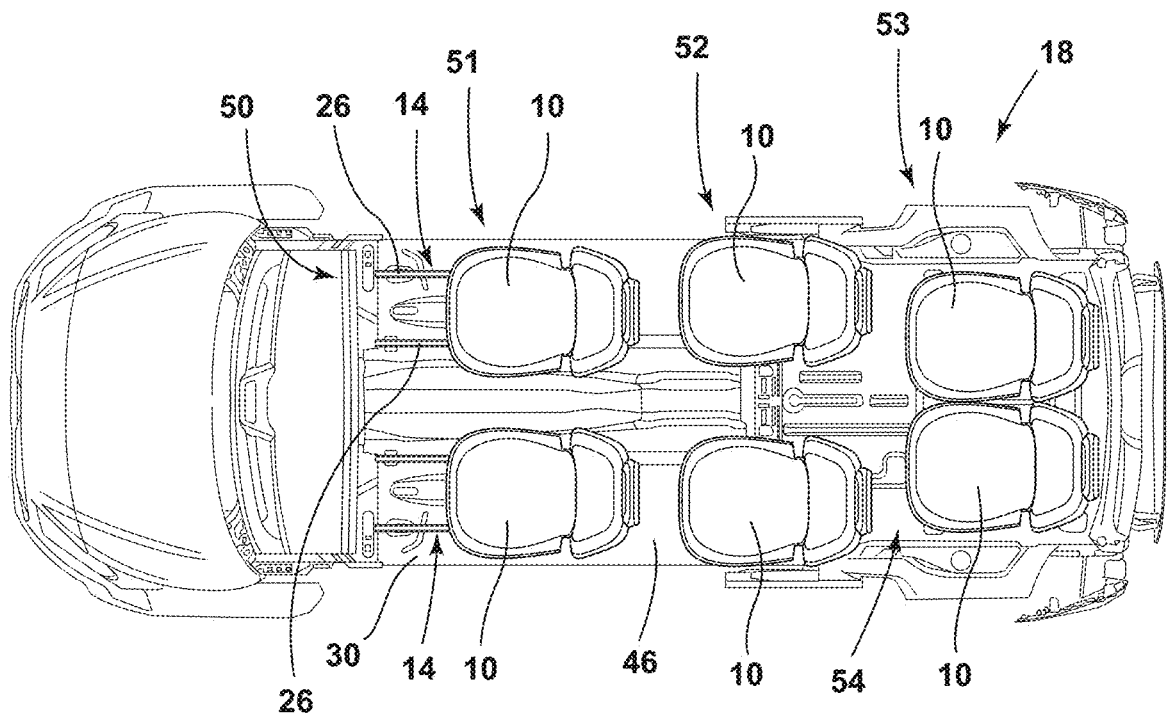
FIG. 1 is a top plan view of a portion of a vehicle having a plurality of seating assemblies in a first configuration.

For purposes of description herein, the terms "upper," "lower," "right," "left," "rear," "front," "vertical," "horizontal," and derivatives thereof shall relate to the concepts as oriented in vehicle 18 of FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to the seating assembly 10 described below and shown in the attached figures, a seating assembly 10 may be described from the vantage point of a passenger 12 seated in the seating assembly 10. The side of a seating assembly 10 disposed on a right side of a seated passenger 12 may be referred to as a right side of the seating assembly 10. The side of a seating assembly 10 disposed on a left side of a seated passenger 12 may be referred to as a left side of the seating assembly 10.

Figure 2:
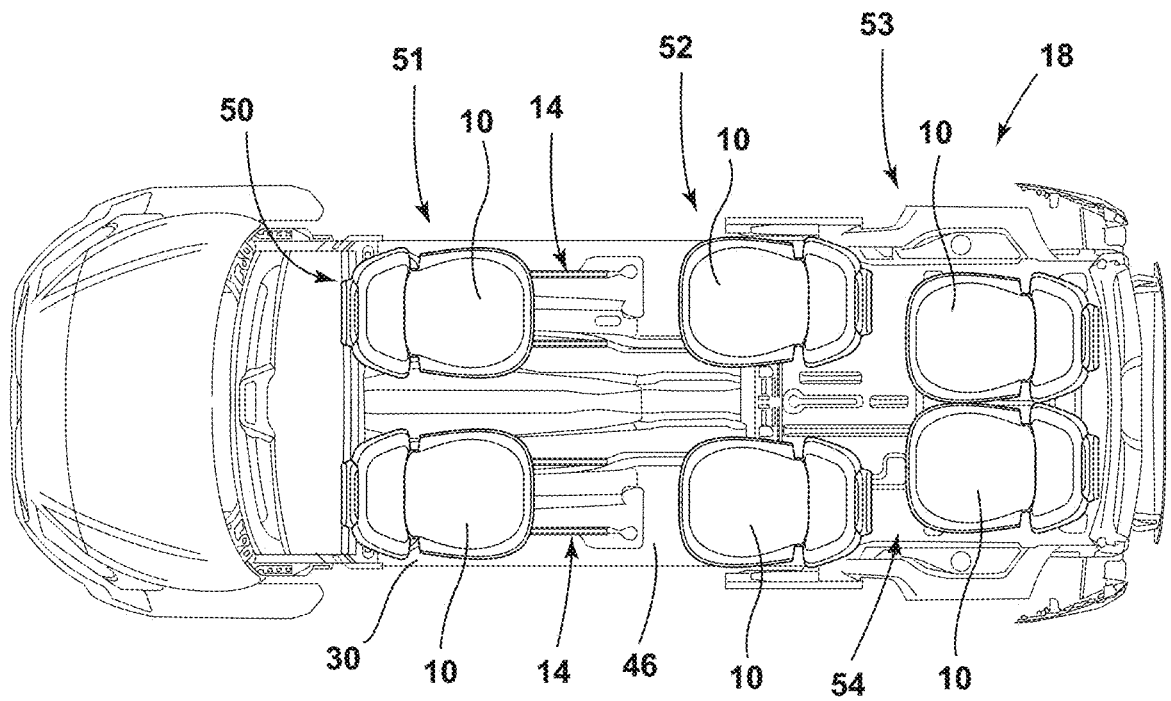
FIG. 2 is a top plan view of a portion of a vehicle having a plurality of seating assemblies in a second configuration.
Figure 3:
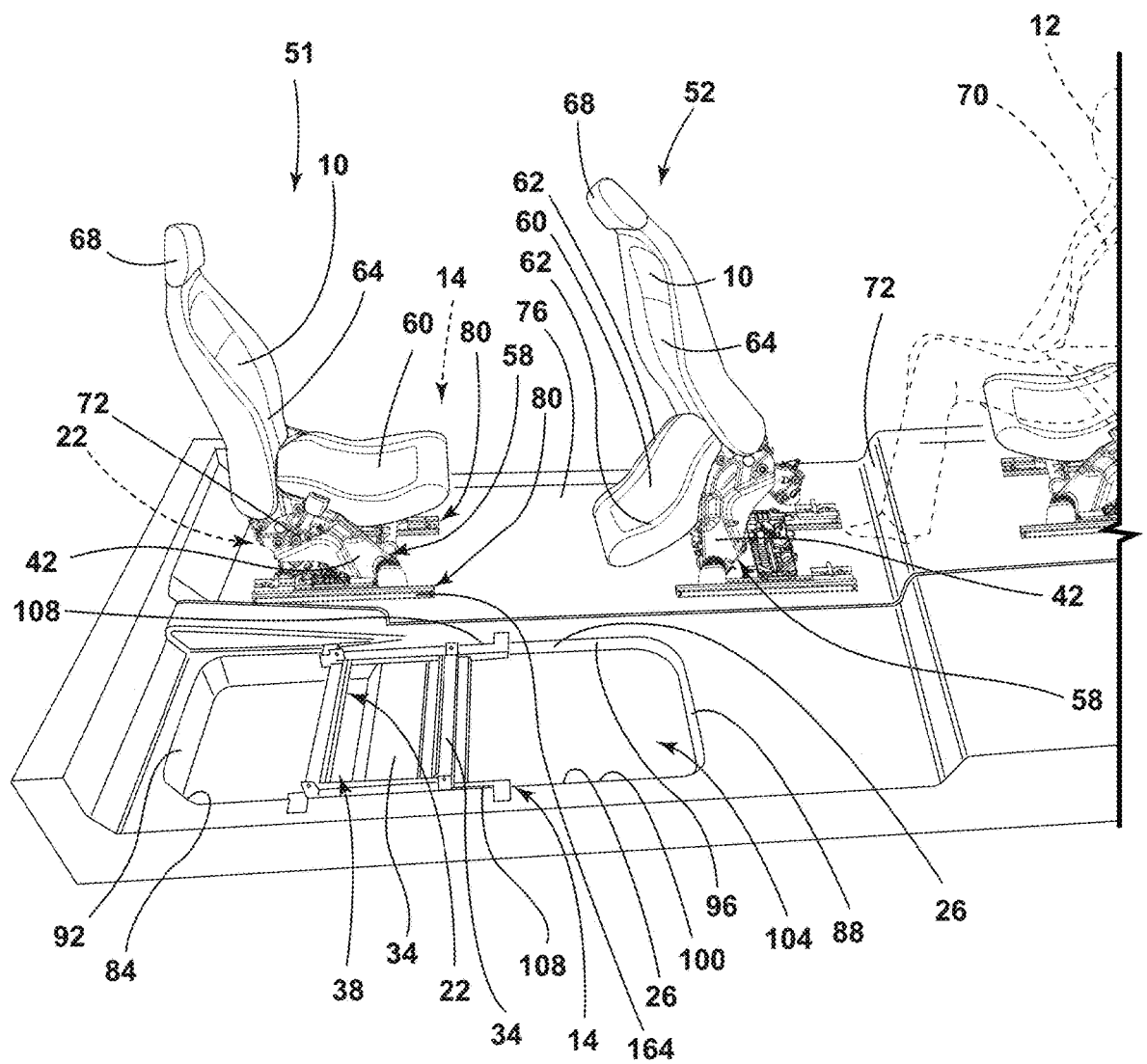
FIG. 3 is a side perspective view of a floor of a vehicle including a plurality of seating assemblies and a track assembly.

Referring to FIGS. 1-3, a vehicle seating assembly 10 may include various features for providing movability of the vehicle seating assembly 10. The vehicle seating assembly 10 may include a track assembly 14 for translating the vehicle seating assembly 10 fore and aft within the vehicle 18. The track assembly 14 may be a long track assembly 14 or a short track assembly 14 for full or partial movement of the seating assembly 10 within the vehicle 18, respectively. The seating assembly 10 may further include a platform 22 extending between tracks 26 of the track assembly 14. The platform 22 and the track assembly 14 may be integrated into the vehicle underbody frame 30 to provide structural stiffness and side-impact performance. The platform 22 may include cross members 34 configured to allow the structural stiffness needed for side-impact performance to move with the seating assembly 10, allowing the seating assembly 10 to be moved into various positions while maintaining structural support. Further, the platform 22 may also include a universal attachment system 38 to allow various seating assemblies 10 to couple with the platform 22 including, for example, rotating seating assemblies. Also, a seating assembly 10 may have a base 42 that may be a module that may be received by the universal attachment system 38 of the platform 22. The platform 22 may include extendable, or widening, cross members 34 that may be adjustable to configure the platform 22 to receive bases 42 of various widths that may correspond to seating assemblies 10 of various widths.

Referring now to FIGS. 1 and 2, a vehicle underbody frame 30 is shown having a plurality of seating assemblies 10. The vehicle underbody frame 30 may include a floor panel 46 configured to support the plurality of seating assemblies 10. The vehicle underbody frame 30 may further include a front area 50 and a rear area 54. One or more of the plurality of seating assemblies 10 may be configured as the movable vehicle seating assembly 10. It is contemplated that the vehicle 18 may be any type of vehicle, for example, a car, a truck, a van, or other vehicle. It is also contemplated that the vehicle 18 may be an autonomous vehicle. It is also contemplated that the concept set forth in this disclosure may be utilized in the second row 52 of seating assemblies 10 of the vehicle 18. The concept may also be utilized in the first or third rows 51, 53 of seating assemblies 10 of the vehicle 18.

A portion of the plurality of seating assemblies 10 of FIGS. 1 and 2 is shown positioned within the front area 50 of the vehicle 18 with one or more of the plurality of seating assemblies 10 being configured a movable vehicle seating assemblies 10. Another portion of the plurality of seating assemblies 10 may be positioned elsewhere within the vehicle 18. The plurality of seating assemblies 10 may be operably coupled to the floor panel 46 of the vehicle 18 by track assemblies 14. Any one of the plurality of seating assemblies 10 may be configured as a movable vehicle seating assembly 10. The vehicle seating assemblies 10 may be translatable along the respective track assembly 14 between a first position of the seating assembly 10 (FIG. 1) and a second position of the seating assembly 10 (FIG. 2). Additionally, the vehicle seating assemblies 10 may be rotatable relative to the platform 22 using a swivel assembly (not shown). Where the vehicle seating assemblies 10 are rotatable, the vehicle seating assemblies 10 may further be movable between a forward facing position in the vehicle 18 (FIG. 1) and a rearward facing position in the vehicle 18 (FIG. 2).

Referring now to FIG. 3, the seating assembly 10 may include a seat 60 and a seatback 64. The seat 60 may be disposed above the base 42. The base 42 may be slidably coupled to the rails 164. The base 42 may have a low profile that is similar to the profile of the rails 164. The rails 164 may be disposed in the tracks 26. In some examples, the tracks 26 may define the rails 164. An assembly of parts 58 for securing the seat 60 to the base 42 may be disposed between the seat 60 and the base 42. The seat 60 may include bolsters 62 that may be disposed on opposing sides of the seat 60. The seatback 64 may be pivotably coupled to the seat 60. A headrest 68 may be coupled to the seatback 64. The passenger 12 may be restrained by a seat belt 70. According to various examples, the seating assembly 10 may include covers 72 positioned on either side of the seating assembly 10.

With continued reference to FIG. 3, a floor cover 76 may be positioned above and parallel to the floor panel 46 and may be configured to conceal the track assembly 14. The floor cover 76 may define a plurality of slots 80. The plurality of slots 80 may be defined over the tracks 26 of the track assembly 14, such that the platform 22 may extend at least partially through the plurality of slots 80 to couple to the track assembly 14. Each of the slots 80 may be defined to have a length selected to allow movement of the seating assembly 10 between the first position of the seating assembly 10 (FIG. 1) and the second position of the seating assembly 10 (FIG. 2).

Referring again to FIG. 3, the floor cover 76 may further conceal a cutout 84 of the floor panel 46. The cutout 84 may be configured to house the track assembly 14. The cutout 84 may include front and rear walls 88, 92 and sidewalls 96, 100. The sidewalls 96, 100 may be spaced apart and may frame a void 104 in the cutout 84. The track assembly 14 may be positioned within the void 104. In various examples, the platform 22 may at least partially be positioned within the void 104 and the track assembly 14. The track assembly 14 may include guides 108 positioned on first and second sides of the seating assembly 10 and operably coupled with the cutout 84. The guides 108 may be positioned in pairs. Each guide 108 may be operably coupled with one of the sidewalls 96, 100, such that the track assembly 14 is recessed within the cutout 84, as the seating assembly 10 is translated between the first position of the seating assembly 10 (FIG. 1) and the second position of the seating assembly 10 (FIG. 2).

It may be desirable for passengers 12 to have convenient egress from a vehicle 18. A seating assembly 10 may be moved from a sitting position I to a standing position II to provide space for a passenger 12 seated behind the seating assembly 10 to exit the vehicle 18. Additionally, a seating assembly 10 in the standing position I may be moved toward the front of the vehicle 18 along rails 164. A passenger 12 may conveniently move the seating assembly 10 from the sitting position I to the standing position II by pressing a button (for example, activation button 372) to activate a power actuator 188. Alternatively, a passenger 12 may manually move the seating assembly 10 from the sitting position I to the standing position II. A passenger 12 may manually move the seating assembly 10 if power is not available or if the passenger 12 prefers manual actuation to power actuation.

Additionally, when the seating assembly 10 is in the standing position II, the latch assemblies 168 may be tucked along the side bracket 180 of the seat 60 for more convenient vehicle egress. The latch assemblies 168 may be moved from an untucked position VII to a tucked position VIII as the seating assembly 10 is moved from the sitting position I to the standing position II. As such, obstructions during egress of a passenger 12 from the vehicle 18 may be minimized. The positioning of the vehicle seating assembly 10 for convenient passenger egress from the vehicle 18 may also provide a position for convenient passenger ingress or entry into the vehicle 18.

Referring to FIGS. 1-35, a lift mechanism 124 for a vehicle seating assembly 10 includes a gear assembly 142. The gear assembly 142 may include a first gear and a second gear. A lift mechanism 124 may further include a mounting bracket 140 coupled to a vehicle 18 and sharing a common axis 256 with the first gear, wherein the first and second gears are positionable in a fixedly coupled arrangement at an initial location A relative to the mounting bracket 140 or at a final location B relative to the mounting bracket 140. When the first and second gears are in a fixedly coupled arrangement at the initial location A relative to the mounting bracket 140, the seating assembly 10 is in the sitting position I. When the first and second gears are in a fixedly coupled arrangement at a final location B relative to the mounting bracket 140, the seating assembly 10 is in the standing position II. In one example, the mounting bracket 140 may be fixedly coupled to a base 42 of a vehicle 18. In one example, the first gear may be a sector gear 144. In one example, the second gear may be a pinion gear 148. For power actuation, the fixedly coupled arrangement may include an arrangement where the power actuator 188 has ceased rotating the pinion gear 148 and has thus locked the pinion gear 148 to the sector gear 144. For manual actuation, the fixedly coupled arrangement may include an arrangement where the pin 220 in the primary or extend position III extends into the sector gear 144 to retain the sector gear 144 in a generally fixed position relative to the mounting bracket 140.

Referring to FIGS. 1-35, a vehicle seating assembly 10 includes a seat 60 pivotably coupled to a vehicle 18 at a pivotable coupling 120 disposed at a forward portion 60A of the seat 60. The vehicle seating assembly 10 also includes a lift mechanism 124 disposed between the seat 60 and the vehicle 18. The lift mechanism 124 is configured to rotate the seat 60 around the pivotable coupling 120 from a sitting position I to a standing position II. The lift mechanism 124 includes a power actuator assembly 128 and a manual actuator assembly 132. According to one example, the power actuator assembly 128 or the manual actuator assembly 132 may be used to rotate the seat 60 around the pivotable coupling 120 from the sitting position to the standing position.

With continued reference to FIGS. 1-35, a vehicle seating assembly 10 includes an elongated member 136 disposed at a forward portion 60A of the seat 60 and extending between opposing side brackets 180 of the seat 60. A mounting bracket 140 is fixedly coupled to the vehicle seating assembly 10. A sector gear 144 is arrangeable in an attached relationship or a detached relationship relative to the mounting bracket 140. A pinion gear 148 is operably coupled with the sector gear 144. A first actuator is coupled to a side bracket 180 of the seat 60 and configured to drive the pinion gear 148. The vehicle seating assembly 10 also includes a second actuator. The first actuator is engageable to rotate the pinion gear 148 along the sector gear 144 to move the vehicle seating assembly 10 between a first position (for example, sitting position I) and a second position (for example, standing position II). The second actuator is engageable to position the sector gear 144 in a detached relationship relative to the mounting bracket 140 to release the sector gear 144 to rotate around the elongated member 136 between an initial position and a final position. In one example, the first actuator may be a power actuator, and the second actuator may be a manual actuator (for example, arm 190 in communication with pin assembly 224). In one example, the attached relationship may be defined by a pin 220 being inserted into the sector gear 144 such that the pin 220 is in the primary or inserted position III. In one example, the detached relationship may be defined by a pin 220 being removed from the sector gear 144 such that the pin 220 is in the secondary or withdrawn position IV.

Figure 4:
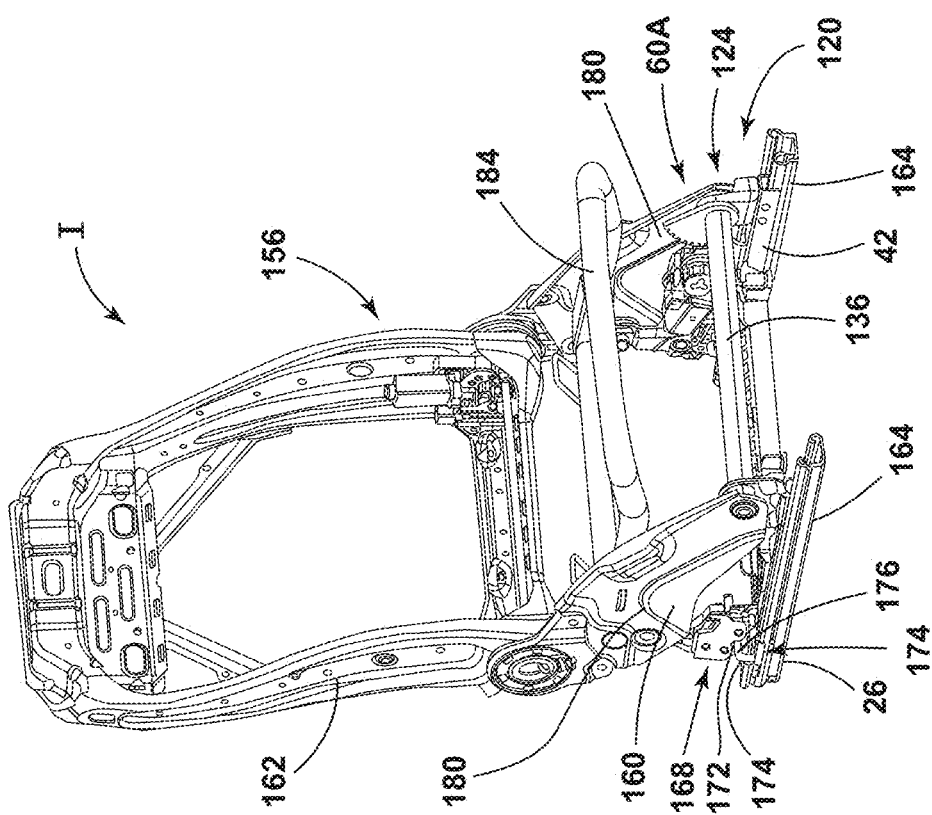
FIG. 4 is a front perspective view of a seating assembly frame coupled to rails in a sitting position.

Referring to FIG. 4, the seating assembly frame 156 is shown in the sitting position I. The sitting position I may also be referred to as the design position. The seating assembly frame 156 may include a seat frame 160 and a seatback frame 162. The seatback frame 162 may be pivotably coupled to the tracks 26 of the track assembly 14. As previously explained, the tracks 26 may include or be defined by rails 164. The rails 164 may extend along the floor panel 46 of the vehicle 18. The seating assembly 10 may be slidably coupled to rails 164. The seating assembly 10 may include a lift mechanism 124 disposed at the left side of the seating assembly 10. In various examples, the seating assembly 10 may include lift mechanisms 124 disposed at the left and right sides of the seating assembly 10. In another example, the seating assembly 10 may include a lift mechanism 124 disposed at a right side of the seating assembly 10. The seating assembly 10 may include a pair of latch assemblies 168 disposed at the rear portion 60B of the seat 60. The pair of latch assemblies 168 may be disposed on the left and right sides of the seating assembly 10. The latch assemblies 168 may be detachable from mount assemblies 174 disposed on, in, or proximate the rails 164 to pivot the seat 60 about an axis 256 defined by the lift mechanism 124 disposed at the forward portion 60A of the seat 60. The latch assemblies 168 may include a latching claw 172. The mount assembly 174 may include a striker 176. The seating assembly frame 156 may include side brackets 180 disposed on opposing sides of the seat frame 160. The seating assembly 10 may also include a carrier 184 extending away from the coupling of the seat 60 and the seatback 64. The carrier 184 may be a cantilevered member. The carrier 184 may support a seat pan 208 and/or a seat cushion.

Figure 5:
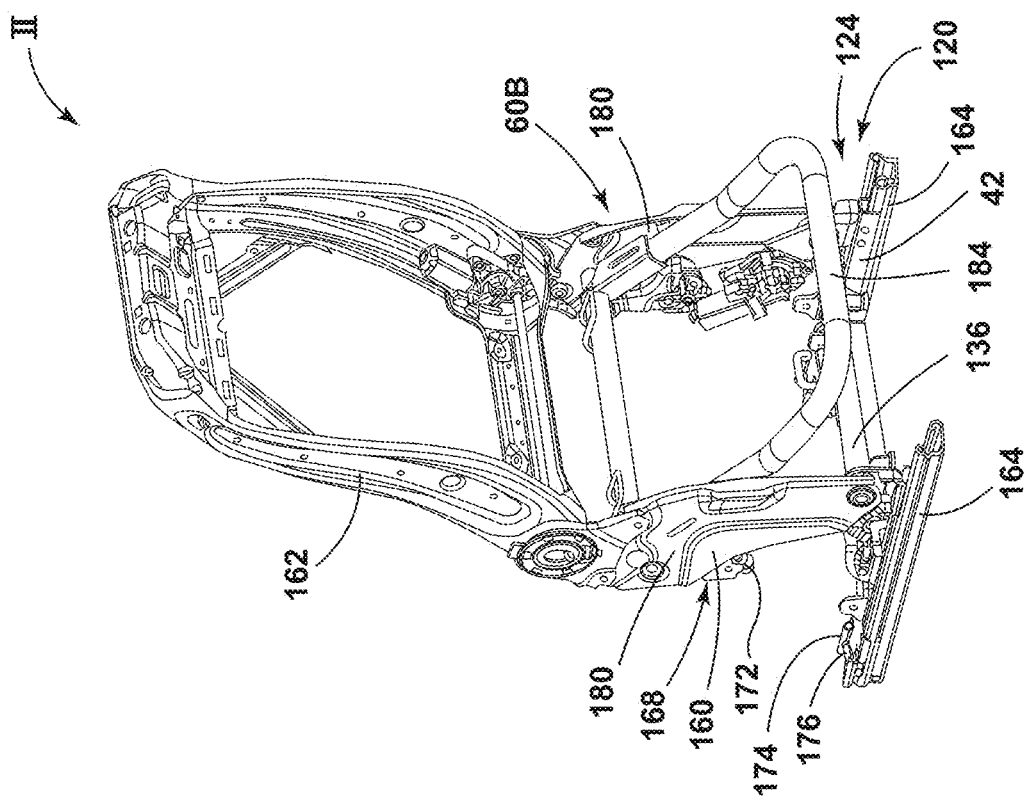
FIG. 5 is a front perspective view of the seating assembly frame coupled to rails of FIG. 4 in a standing position.

Referring to FIG. 5, the seating assembly frame 156 is shown in a standing position II. The rear portion 60B of the seat 60 is shown released from the rails 164 disposed at the back of the seat 60. The seating assembly 10 may be moved from the sitting position I to the standing position II by power actuation or manual actuation. The seating assembly 10 may be moved from the standing position II to the sitting position I through power actuation or manual actuation.

With continued reference to FIG. 5, power actuation of the seating assembly 10 may occur when a power actuator 188 moves the seat 60 in response to an input 368. The input 368 may include an activation signal from the passenger 12 (for example, pressing an activation button 372 (FIG. 32) on or near the seating assembly 10, and/or remote actuation by a key fob). The input 368 may also include an activation signal generated in response to a predetermined input (for example, opening of a vehicle door and detection of a passenger 12 proximate the vehicle door, detection of a passenger 12 in the third row 53 of seating assemblies 10 behind a vehicle seating assembly 10 disposed in a second row 52, and/or detection of an arrival destination of the passenger 12). During power actuation, a power actuator 188, such as a motor, may be used to release the latch assemblies 168 from the mount assemblies 174 and to move the seating assembly 10 between the sitting position I and the standing position II and to intermittent positions between the sitting position I and the standing position II.

With continued reference to FIG. 5, manual actuation of the seating assembly 10 may occur when a passenger 12 pulls an arm 190 (FIGS. 28-30) proximate the seating assembly 10 to release the latch assemblies 168 from the mount assemblies 174 and to release a pin 220 in the lift mechanism 124 so that a force F1 (FIG. 18) exerted by a passenger 12 on the seatback 64 and/or a force F2 (FIG. 21) generated by a biasing member (clock spring 236) coupled to the lift mechanism 124 may move the seating assembly 10 from the sitting position I to the standing position II. Similarly, a passenger 12 may manually move the seating assembly 10 from the standing position II to the sitting position I by pulling the arm 190 proximate the seating assembly 10 to release the pin 220 in the lift mechanism 124 so that a force F3 (FIG. 18) exerted by the passenger 12 on the seating assembly 10 may return the seating assembly 10 to the sitting position I. The latching claws 172 of the latch assemblies 168 may engage the strikers 176 of the mount assemblies 174 as the seating assembly 10 is returned to the sitting position I from the standing position II.

Figure 6:
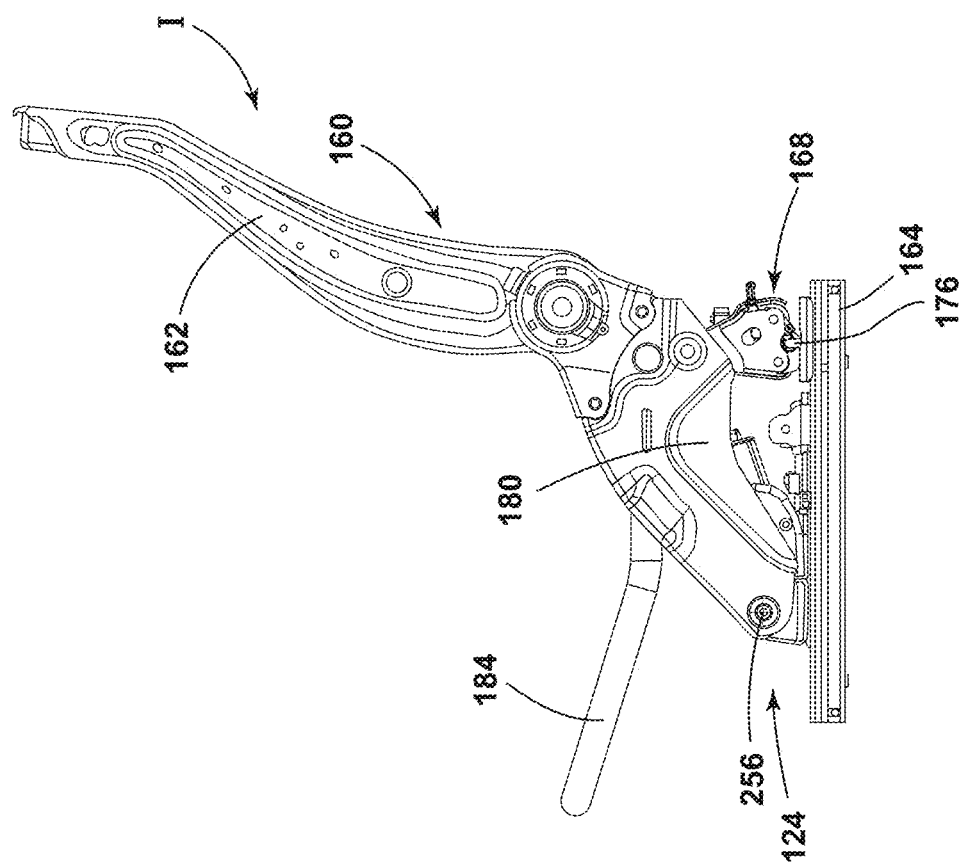
FIG. 6 is a left side elevational view of a seating assembly frame coupled to rails in a sitting position.
Figure 9:
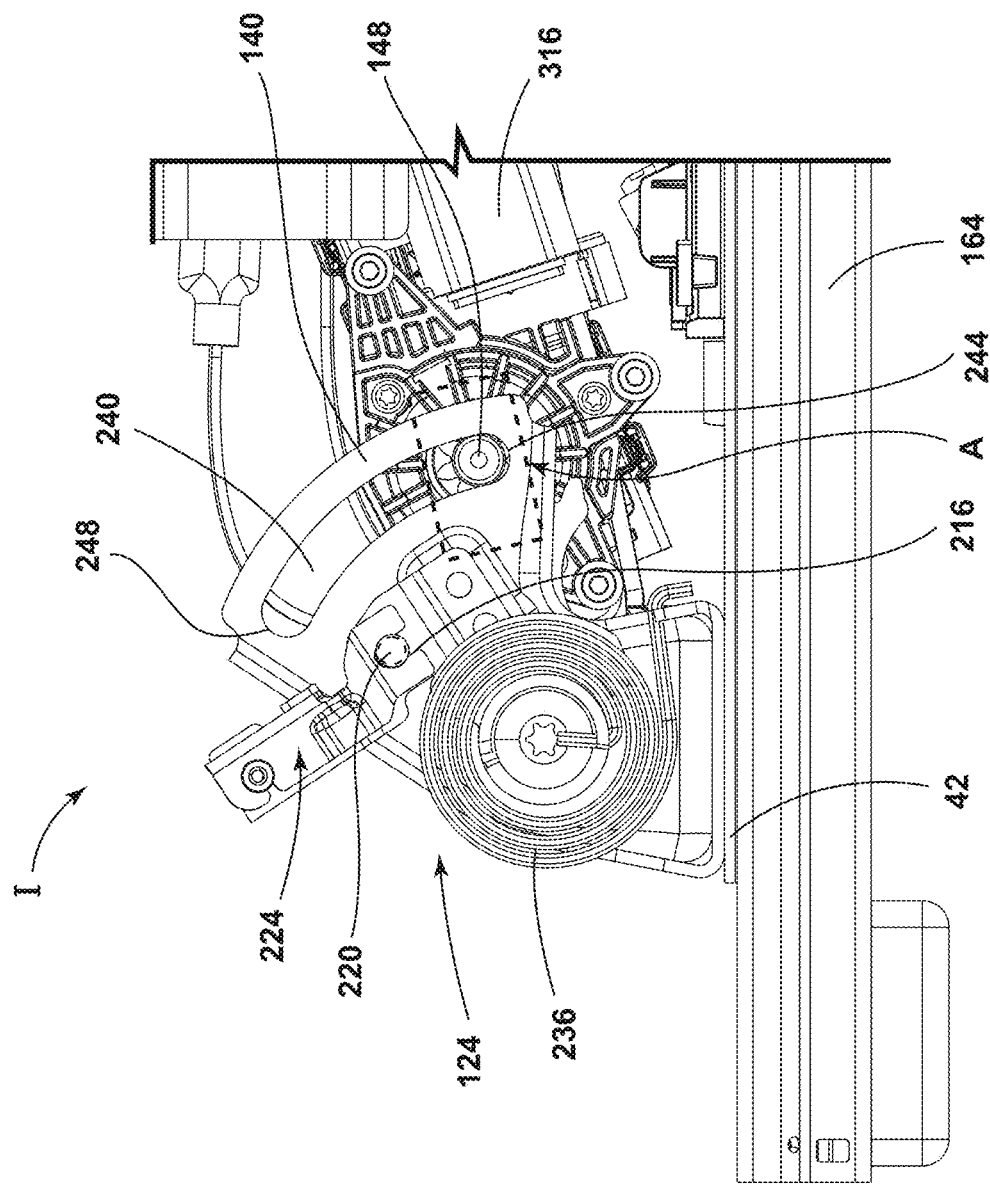
FIG. 9 is a left side elevational view of a lift mechanism of a seating assembly and a rail in a sitting position.

Referring to FIG. 6, a left side elevational view of the seating assembly frame 156 in a sitting position I is shown. The seating assembly frame 156 may be coupled to the rails 164.

Figure 7:
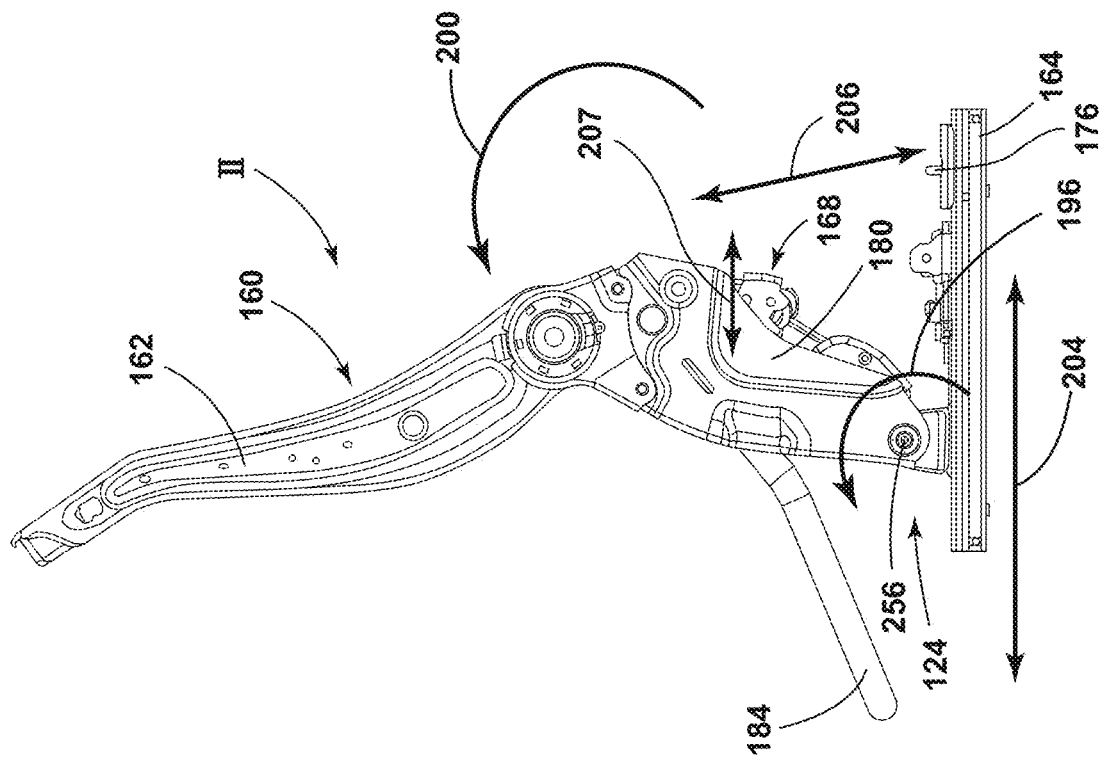
FIG. 7 is a left side elevational view of the seating assembly frame coupled to rails of FIG. 6 in a standing position.

Referring to FIG. 7, a left side elevational view of the seating assembly frame 156 in a standing position II and coupled to the rails 164 is shown. Arrows 196 and 200 show the rotation of the seating assembly frame 156 around the axis of rotation 256 of the lift mechanism 124. Arrow 204 shows motions of the seating assembly 10 along the rails 164 in a direction forward of the seating assembly 10 and in a direction rearward of the seating assembly 10. A passenger 12 seated in the third row 53 of the vehicle 18 may move the seating assembly 10 from the sitting position I to the standing position II by using the power actuator 188 or the manual actuator (for example, arm 190 in communication with pin assembly 224). After the seating assembly 10 is moved to the standing position II, the passenger 12 seated in the third row 53 may have egress space to climb out of the vehicle 18. To provide additional egress space, a passenger 12 may move the seating assembly 10 in the standing position II along the rails 164 in a direction forward of the seating assembly 10, as shown by arrow 204. Arrows 206 and 207 show positioning of the latch assembly 168 from a position transverse to the side bracket 180 (FIG. 6) to a position along the side bracket 180 (FIG. 7). As such, a passenger 12 may conveniently position the seating assembly 10 to accommodate passenger 12 egress and ingress preferences.

With reference to FIGS. 8-17, details of the seating assembly 10 are shown as the seating assembly 10 moves from the sitting position I to the standing position II due to a power actuation. Referring to FIG. 8, the seating assembly 10 is shown in the sitting position I. A seat pan 208 may be disposed over the carrier 184. The lift mechanism may be disposed proximate the front of the side bracket 180.

Figure 16:
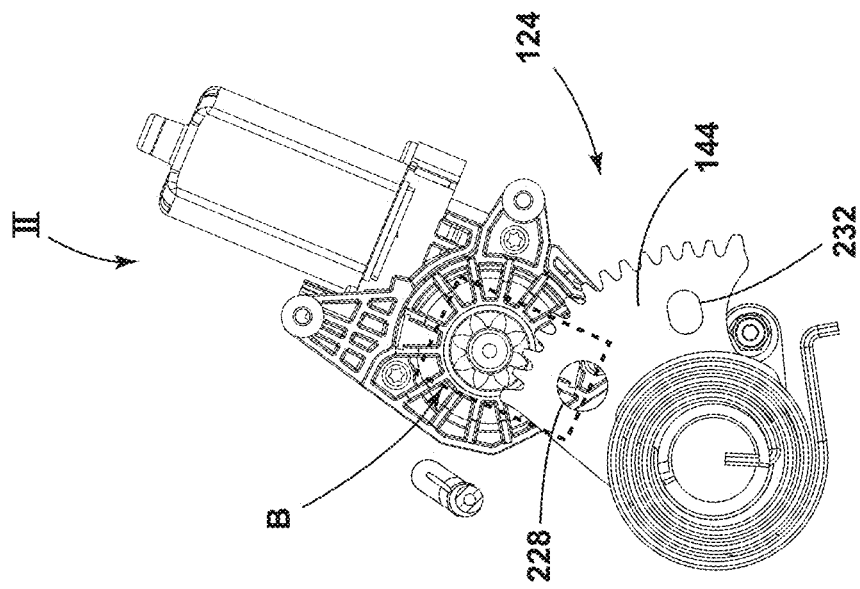
FIG. 16 is a left side elevational view of a portion of the lift mechanism of a seating assembly frame in the standing position of FIG. 14.
Figure 17:
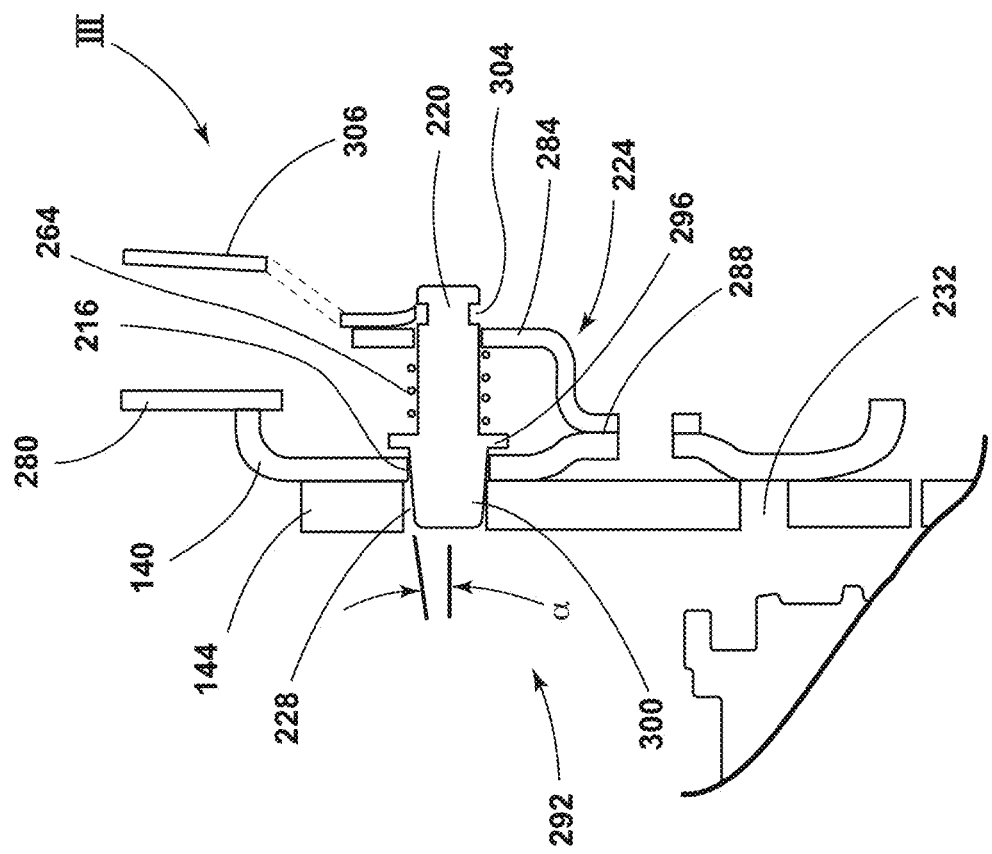
FIG. 17 is a cross-sectional view of a pin assembly of the lift mechanism taken along line XVII-XVII of FIG. 15 with the pin in the primary or extended position.

With continued reference to FIGS. 8-17, the lift mechanism 124 is shown when the seating assembly 10 is in the sitting position I. The lift mechanism 124 may be coupled to the rail 164. The lift mechanism 124 may include a pin assembly 224 in communication with a manual actuator (for example, arm 190 in communication with pin assembly 224), a sector gear 144, a pinion gear 148 coupled to a power actuator 188, and a mounting bracket 140. The power actuator 188 may drive a pinion gear 148. The pinion gear 148 may include a plurality of equally spaced teeth 212A. A mounting bracket 140 may be fixed to the seat frame 160 and the base 42. A pin assembly 224 may be mounted to the mounting bracket 140 at a mount 324. The mounting bracket 140 may include a hole 216 for receiving a pin 220 that may be coupled to the pin assembly 224. During use of the power actuator 188, the pin 220 may extend through the mounting bracket 140 and a sector gear 144 disposed behind the mounting bracket 140. As such, the pin 220 may retain the sector gear 144 in a fixed position relative to the mounting bracket 140. The pin 220 may be in a primary or extended position III (FIG. 17). In the primary or extended position III of the pin 220 shown in FIG. 9, the pin 220 may extend into the hole 216 of the mounting bracket 140 and the hole 228 (FIG. 11) of the sector gear 144 to maintain the mounting bracket 140 in a fixed relationship to the sector gear 144. A biasing member (clock spring 236) may be disposed on the outside of the lift mechanism 124. The mounting bracket 140 may include a cutaway portion 240 for limiting the movement of the pinion gear 148. The cutaway portion 240 may have two ends 244, 248. The pinion gear 148 is shown at the end 244 of the cutaway portion 240. The sector gear 144 and the pinion gear 148 may be positioned in a fixedly coupled arrangement at the initial location A relative to the mounting bracket 140.

Figure 10:
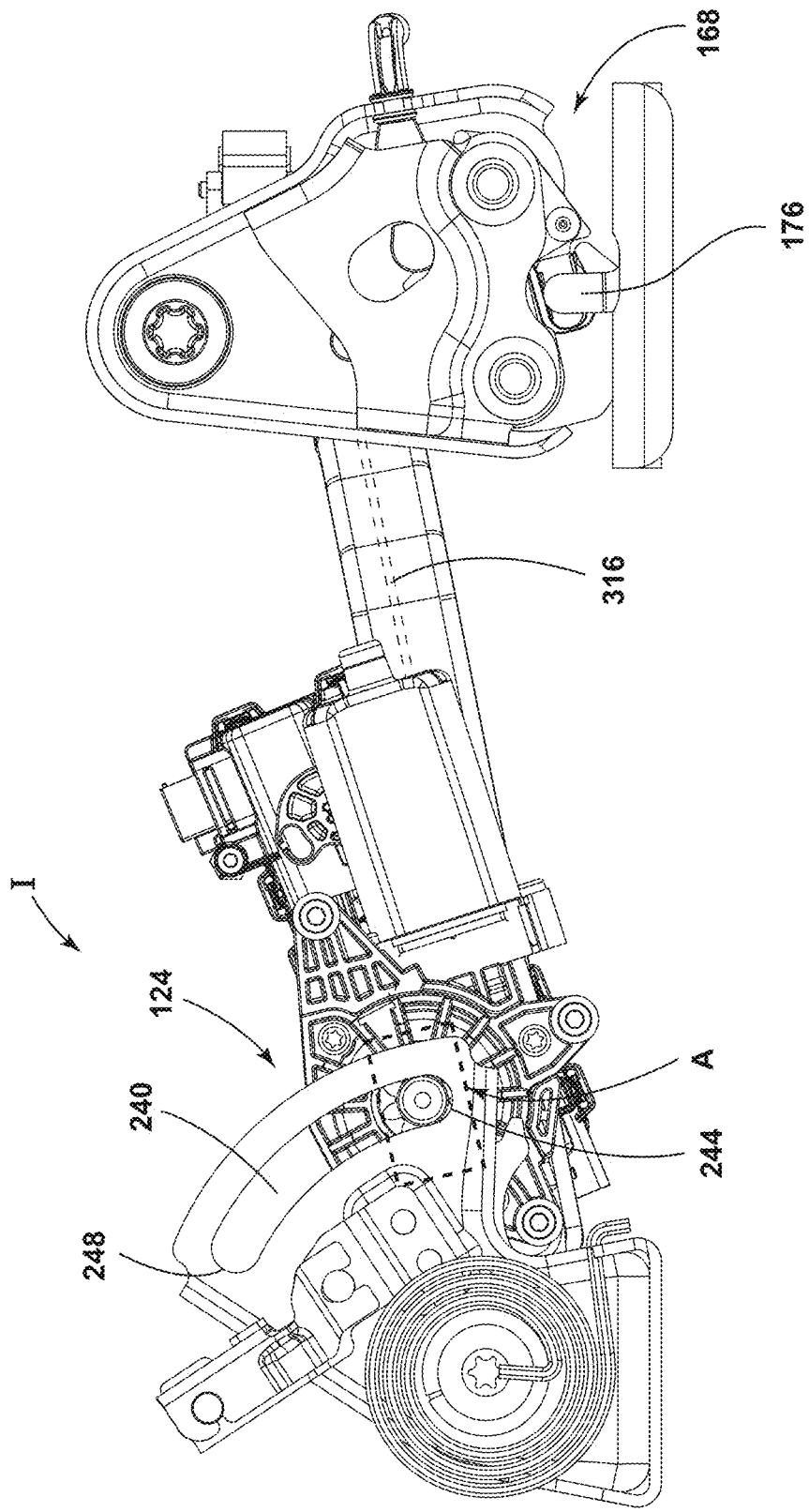
FIG. 10 is left side elevational view of a lift mechanism and a latch assembly of a seating assembly in a sitting position.

With reference to FIG. 10, the lift mechanism 124 is shown with the latch assembly 168 when the seating assembly 10 is in the sitting position I. The latch assembly 168 is shown engaged with the striker 176. With continued reference to FIG. 10, the link 316 is shown extending between the lift mechanism 124 and the latch assembly 168. As the power actuator 188 rotates the pinion gear 148 around the sector gear 144 (FIGS. 11, 12), the travel of the pinion gear 148 may move the seating assembly 10 from the sitting position I to the standing position II.

Figure 11:
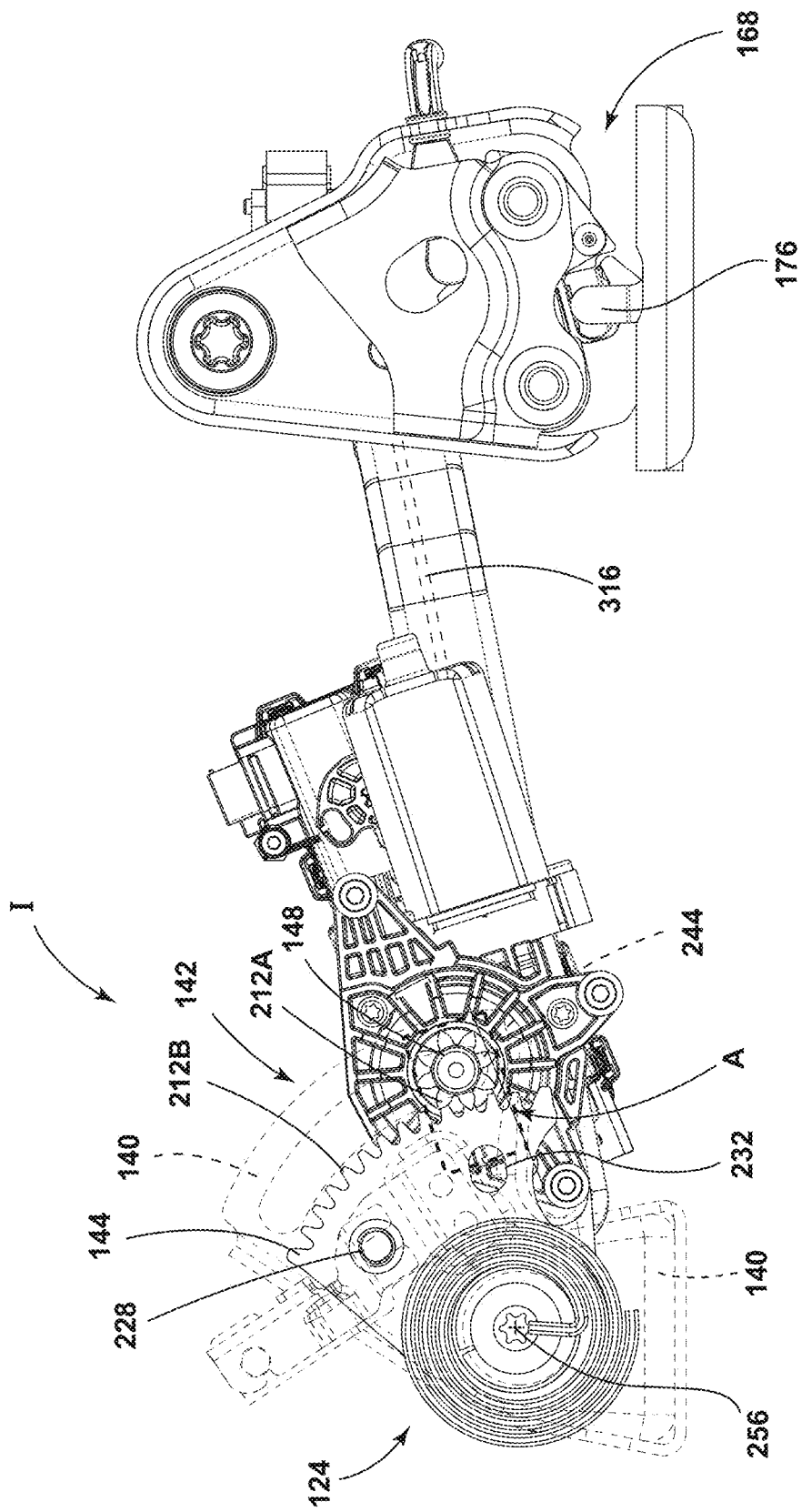
FIG. 11 is a left side elevational view of the lift mechanism and the latch mechanism of the seating assembly in a sitting position of FIG. 10.

Referring now to FIG. 11, the lift mechanism 124 is again shown with the latch assembly 168 when the seating assembly 10 is in the sitting position I. The gear assembly 142 may move the seating assembly 10 between the sitting position I and the standing position II. The gear assembly 142 may include a sector gear 144 and a pinion gear 148. The sector gear 144 may include holes 228 and 232 for receiving the pin 220 of the pin assembly 224. During power actuation by the pinion gear 148, the pin 220 may remain in the primary or extended position III (extending through the hole 216 in the mounting bracket 140 and through the hole 228 in the sector gear 144).

With continued reference to FIG. 11, as will be further explained later herein, during manual actuation of the lift mechanism 124 (shown in FIGS. 18-22 and 28-30) to move the seating assembly 10 from the sitting position I to the standing position II, the sector gear 144 and the mounting bracket 140 may initially be in a fixed coupled arrangement at the initial location A (FIG. 11). A passenger 12 may pull on an arm 190 to move the pin 220 to a secondary or withdrawn position IV (withdrawn from the hole 228 in the sector gear 144), and the sector gear 144 and the pinion gear 148 in a fixed coupled arrangement may be rotatable about the lift mechanism axis 256 while the pin is in the secondary or withdrawn position IV. During the manual actuation, the pin 220 may thereafter be positioned in a primary or extended position III in the hole 216 in the mounting bracket 140 and the hole 232 in the sector gear 144 so that the sector gear 144 and the pinion gear 148 may be positioned in a fixedly coupled arrangement at a final location B (FIGS. 20-21) relative to the mounting bracket 140. As such, during manual actuation, the sector gear 144 and the pinion gear 148 may be positioned in a fixedly coupled arrangement at the initial location A (FIG. 11) relative to the mounting bracket 140 when the seating assembly 10 is in the sitting position I and in a final location B (FIGS. 20-21) relative to the mounting bracket 140 when the seating assembly 10 is in the standing position II.

Figure 12:
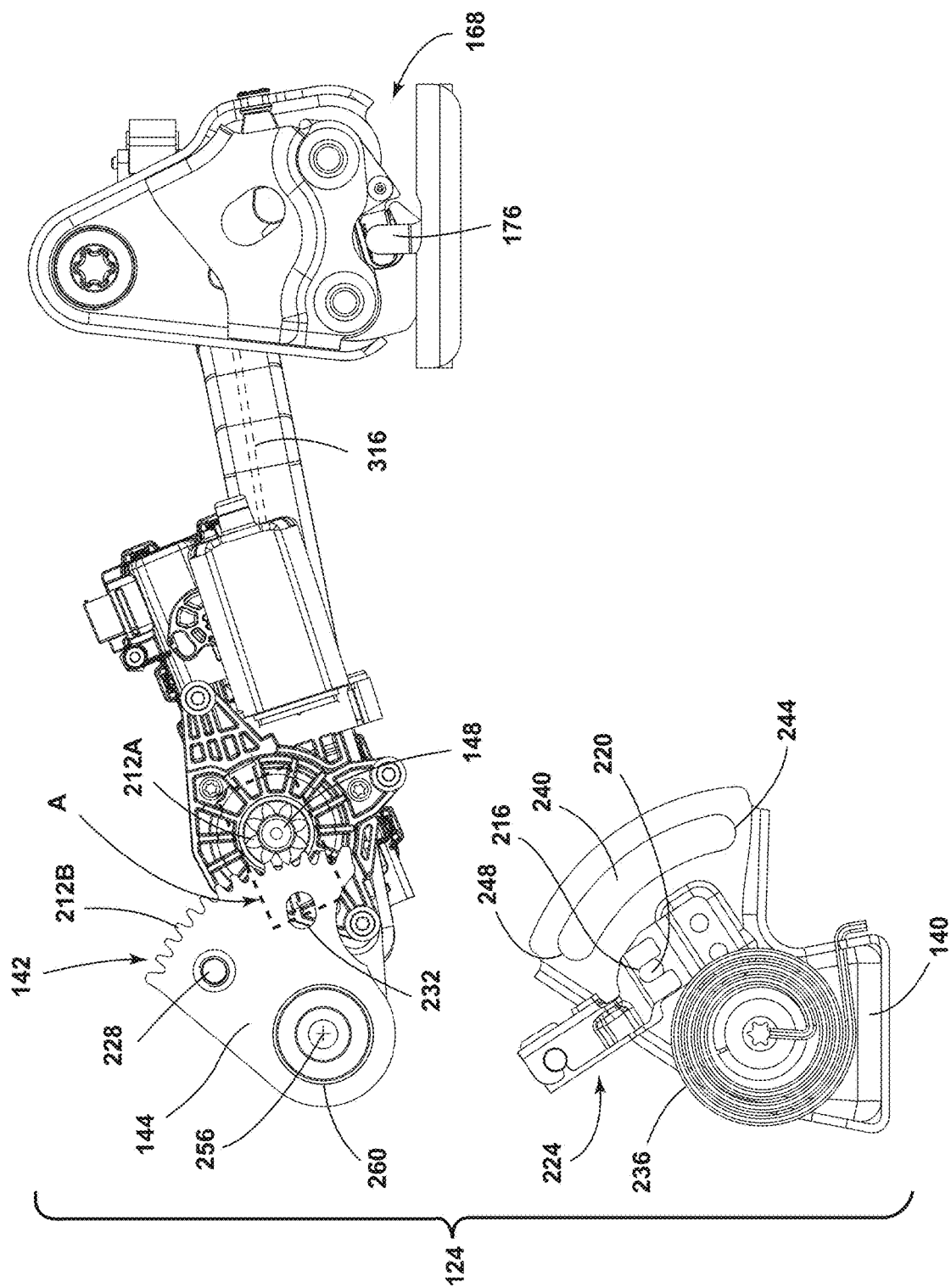
FIG. 12 is an left side elevational assembly view of the lift mechanism and the latch mechanism of the seating assembly in a sitting position of FIG. 10.

Referring now to FIG. 12, an assembly view of the lift mechanism 124 is shown when the seating assembly 10 is in the sitting position I. The latch assembly 168 is also shown. The mounting bracket 140, the pin assembly 224, and the biasing member (clock spring 236) are shown separately from the gear assembly 142. The sector gear 144 may include a central portion 260 configured to be aligned with the axis of rotation 256 defined by the elongated member 136. The axis of rotation 256 may be referred to as the axis of rotation 256 of the lift mechanism 124. The central portion 260 may include an opening. The opening in the central portion 260 may be coupled to the elongated member 136.

With continued reference to FIG. 12, when the power actuator 188 is used to move the pinion gear 148 along the sector gear 144, the sector gear 144 may remain fixed to the mounting bracket 140 and may negligibly rotate about the axis of rotation 256 of the lift mechanism 124. As previously stated, the sector gear 144 may remain fixed to the mounting bracket 140 during power actuation of the vehicle seating assembly 10 because the pin 220 from the pin assembly 224 may extend through the hole 216 of the mounting bracket 140 and the hole 228 of the sector gear 144. As such, the pin 220 may be in the primary or extended position III in hole 228 of the sector gear 144 during power actuation.

Figure 13:
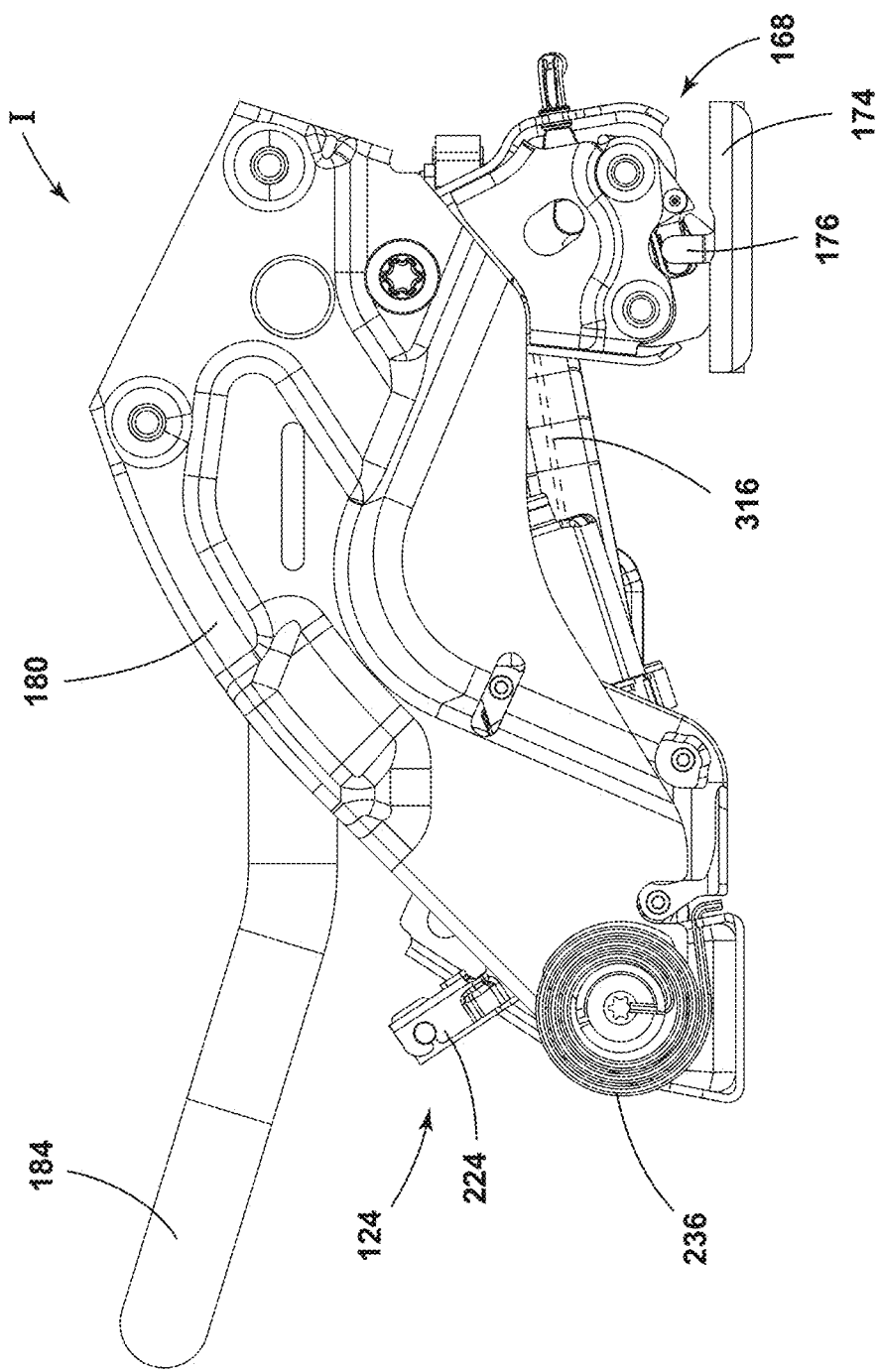
FIG. 13 is a left side elevational view of a lift mechanism, a latch mechanism, and a side bracket.

Referring now to FIG. 13, parts of the seat 60 are shown in the sitting position I. The carrier 184 may extend away from the side bracket 180. The latch assembly 168 may be engaged with the mount assembly 174.

Figure 14:
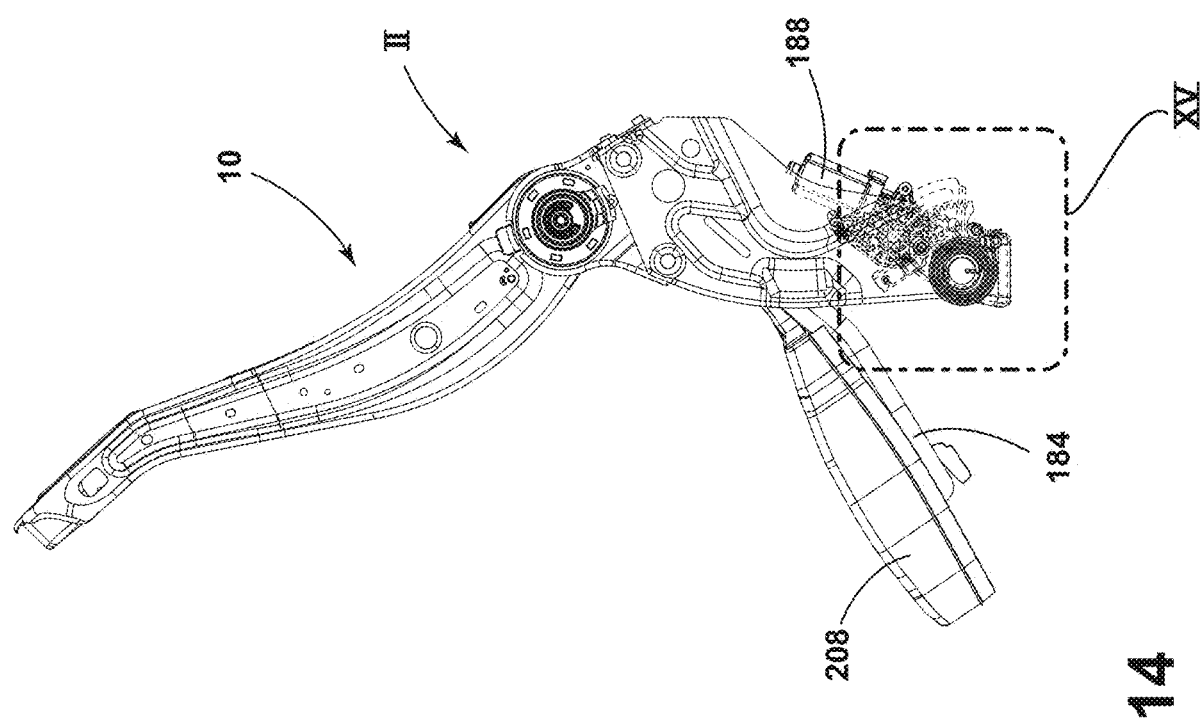
FIG. 14 is a left side elevational view of a lift mechanism of a seating assembly frame and a seat pan in a standing position.

With reference now to FIG. 14, the seating assembly 10 in a standing position II is shown with a seat pan 208 disposed on the carrier 184. The power actuator 188 has been activated to move the seating assembly 10 from the sitting position I to the standing position II.

Figure 15:
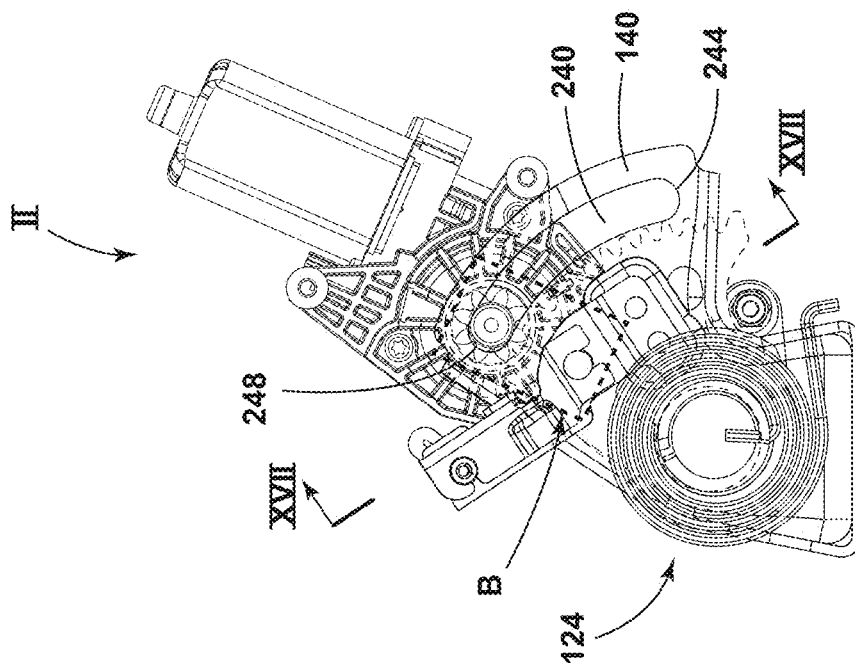
FIG. 15 is a left side elevational view of a lift mechanism of a seating assembly frame in the standing position of FIG. 14.

Referring to FIG. 15, the configuration of the lift mechanism 124 is shown when the seating assembly 10 has been moved to the standing position II due to power actuation of the seating assembly 10. The pinion gear 148 is at the end 248 of the cutaway portion 240 of the mounting bracket 140. The pinion gear 148 has rotated along the sector gear 144 from the end 244 of the cutaway portion 240 of the mounting bracket 140 to the end 248 of the cutaway portion 240 of the mounting bracket 140. The displacement of the side bracket 180 as the pinion gear 148 is rotated along the sector gear 144 from end 244 of the cutaway portion 240 to end 248 of the cutaway portion 240 may cause the seating assembly 10 to move from the sitting position I to the standing position II. The sector gear 144 and the pinion gear 148 may be positioned in a fixedly coupled arrangement at the final location B relative to the mounting bracket 140.

Referring to FIG. 16, another view of the parts of the lift mechanism 124 is shown when the seating assembly 10 has been moved to the standing position II due to power actuation.

Referring to FIG. 17, a cross-sectional view of the pin assembly 224, the mounting bracket 140, and the sector gear 144 is shown when the pin 220 is in the primary or extended position III. The pin assembly 224 may include a first bracket 280, a second bracket 284, a pin 220, and a biasing member (spring 264). The first bracket 280 may be joined to a second bracket 284 at the joinder portion 288. The pin 220 may extend through apertures in the first bracket 280 and the second bracket 284. The pin 220 may include a tapered end 300. In one example, the tapered end 300 may have an angle α of approximately 2 degrees to approximately 15 degrees, and ideally approximately 5.5 degrees. The pin 220 may include a collar portion 296 that may abut the mounting bracket 140 when the pin 220 is in the primary or extended position III. The spring 264 may extend between the collar portion 296 of the pin 220 and the second bracket 284. The spring 264 may be a compressible coil spring. The spring 264 is shown in the extended position in FIG. 17. The pin 220 may include a recess 304 that may extend around an end of the pin 220. The recess 304 may allow the pin release lever 306 to form a collar-like fit around the pin 220. In the example shown, the pin 220 may be described as being in a primary or extended position III. In the primary or extended position III, the pin 220 may extend into the hole 216 in the mounting bracket 140 and a hole 228 or a hole 232 in the sector gear 144 to maintain the sector gear 144 in an attached relationship relative to the mounting bracket 140.

As such, the arrangement of components of the lift mechanism 124 during power actuation of the seating assembly 10 between the sitting position I and the standing position II is shown in FIGS. 8-17.

Figure 18:
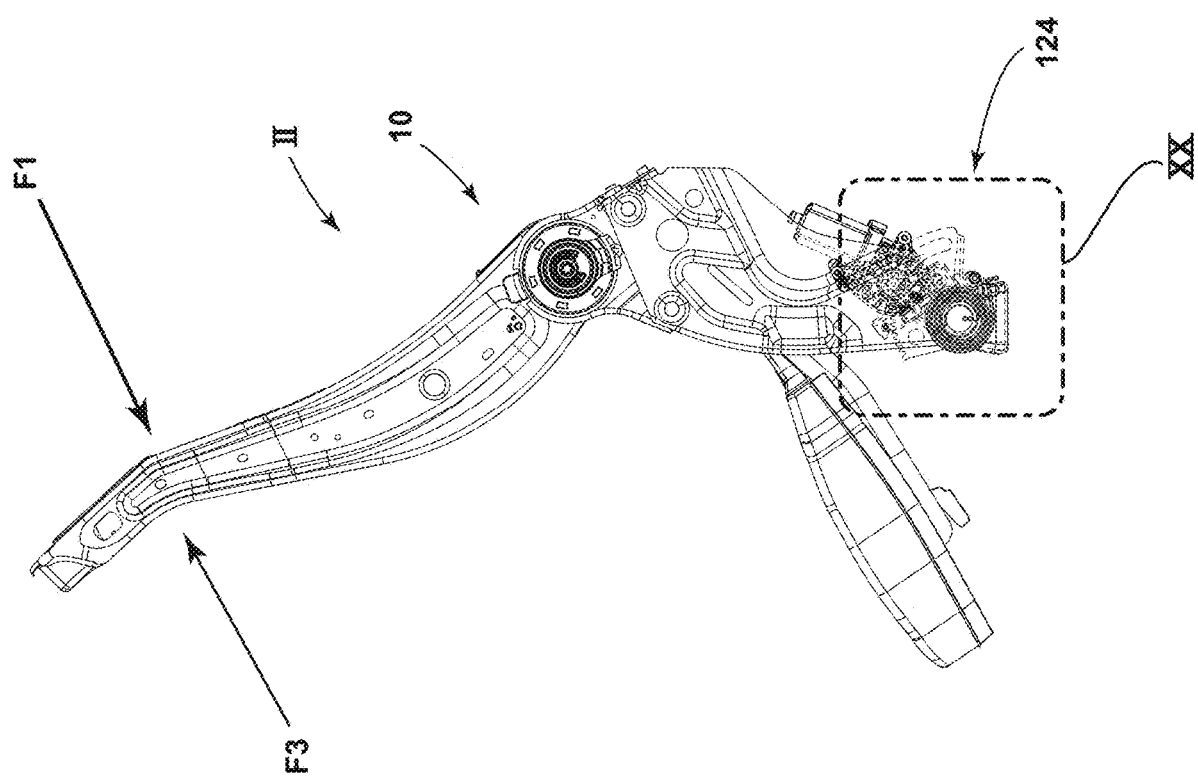
FIG. 18 is a left side elevational view of a seating assembly in a standing position.

Referring now to FIGS. 18-22, the seating assembly 10 is shown in the standing position II when the seating assembly 10 is moved from the sitting position I to the standing position II with manual actuation. As previously stated, a passenger 12 may use manual actuation instead of power actuation to move the seating assembly 10 from the sitting position I to the standing position II. Referring to FIG. 18, upon manual actuation by pulling the arm 190 (FIGS. 28-30), the latch assemblies 168 may disengage from the mounting assemblies 174 and a passenger 12 may exert a manual force F1 on the seating assembly 10 to move the seating assembly 10 from the sitting position I to the standing position II.

Figure 19:
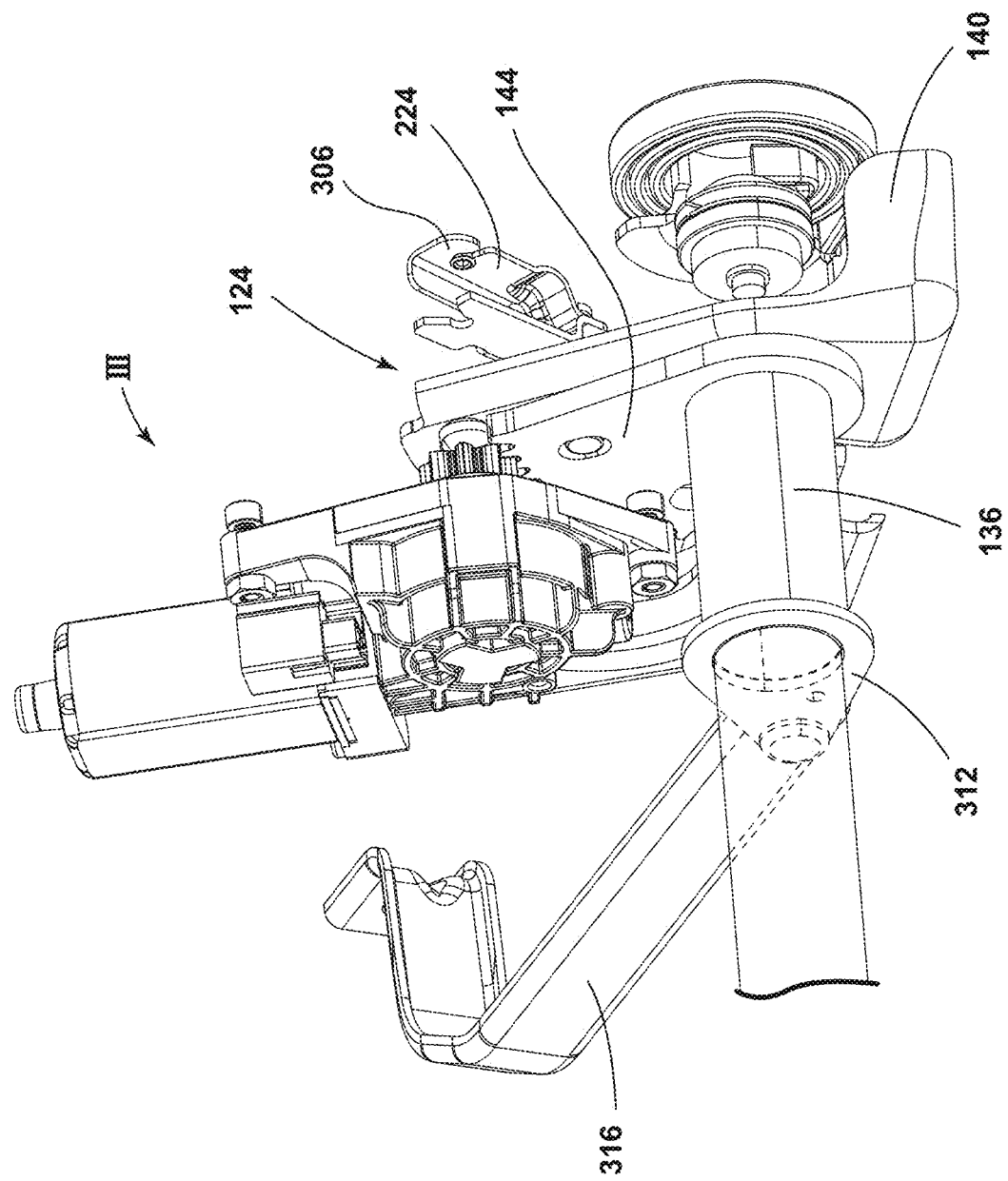
FIG. 19 is a side perspective view of a portion of the lift mechanism of the seating assembly in a standing position.

FIG. 19 shows a perspective view of the lift mechanism 124. The lift mechanism 124 may include an elongated member 136 extending inward from the sector gear 144. The sector gear 144 may be rotatable around the elongated member 136. A linkage 312 may provide for rotatable coupling of the link 316 to the elongated member 136. A linkage 312 may rotate about the elongated member 136.

Figure 20:
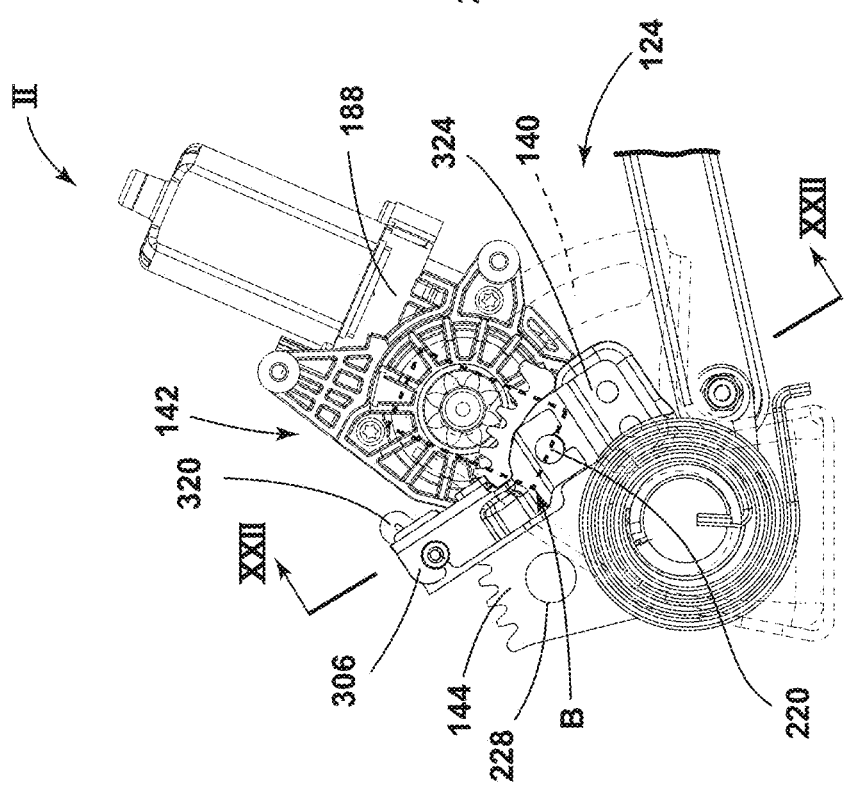
FIG. 20 is a left side elevational view of the lift mechanism of the seating assembly of FIG. 18.

FIG. 20 shows parts of the lift mechanism 124 when the seating assembly 10 has been moved to the standing position II using manual actuation. Gear assembly 142 is shown. The pin 220 may extend through the hole 216 of the mounting bracket 140 and the hole 232 of the sector gear 144. A mount 324 may secure the pin assembly 224 to the mounting bracket 140. The sector gear 144 and the pinion gear 148 may be positioned in a fixedly coupled arrangement at the final location B relative to the mounting bracket 140.

Figure 21:
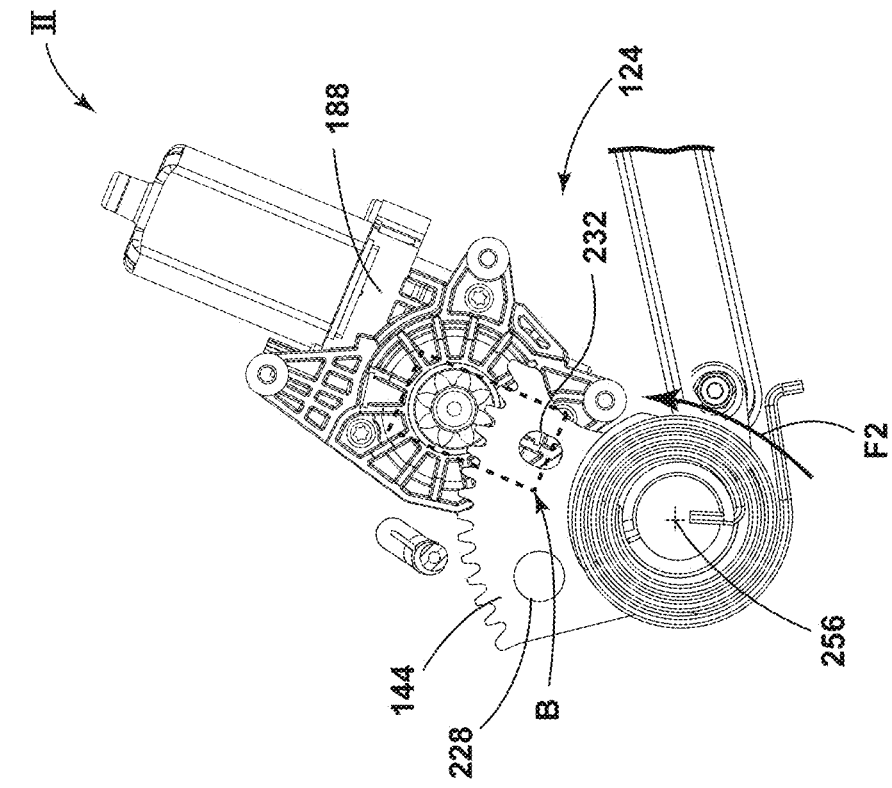
FIG. 21 is a left side elevational view of portions of the lift mechanism of the seating assembly of FIG. 18.

FIG. 21 shows parts of the lift mechanism 124 when the seating assembly 10 has been moved to the standing position II using manual actuation. As previously stated, the sector gear 144 and the pinion gear 148 may be positioned in a fixedly coupled arrangement at the final location B relative to the mounting bracket 140.

Figure 22:
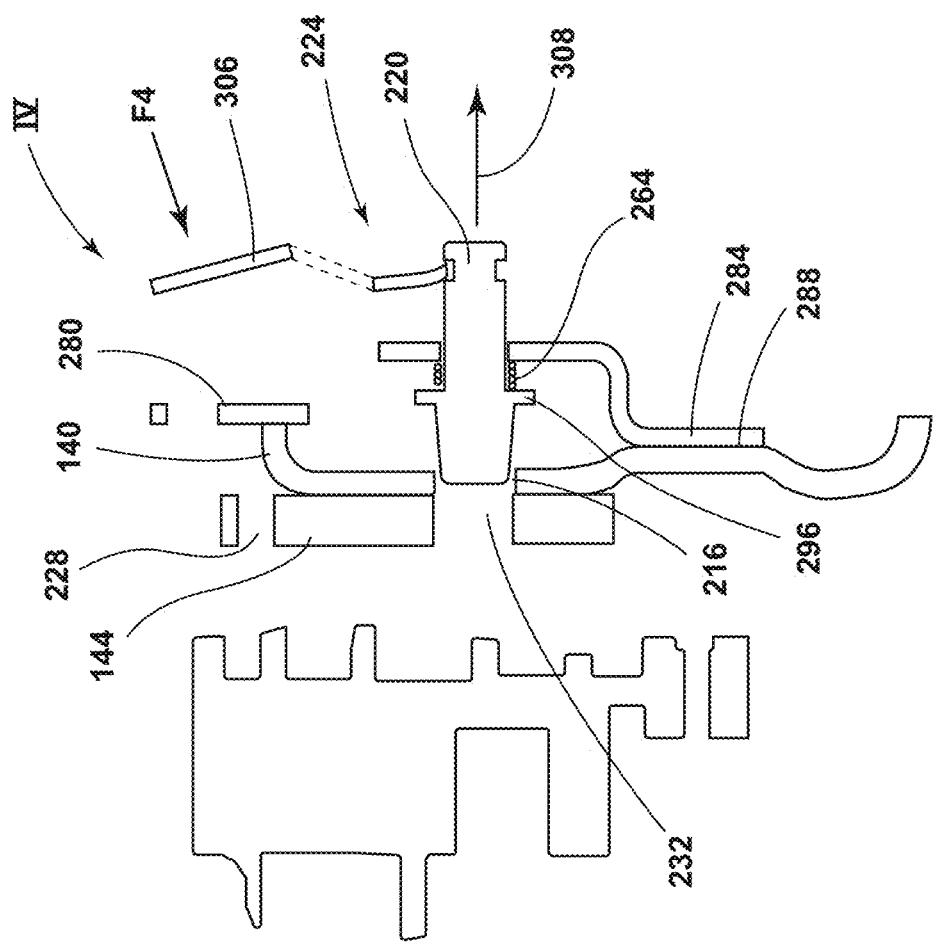
FIG. 22 is cross-sectional view taken along line XXII-XXII of FIG. 20 with the pin in the secondary or withdrawn position.

Referring to FIG. 22, a cross-sectional view of the pin assembly 224, the mounting bracket 140, and the sector gear 144 is shown when the pin 220 is moved to the secondary or withdrawn position IV to allow for rotation of the sector gear 144 around the elongated member 136. A force F4 applied to the pin release lever 306 may cause the pin 220 to move from the primary or extended position III (FIG. 17) to the secondary or withdrawn position IV in the direction shown by arrow 308. In the secondary or withdrawn position IV, the coil spring 264 may be compressed between the collar portion 296 of the pin 220 and the second bracket 284. As such, FIGS. 18-22 show the position of the lift mechanism parts during manual actuation of the lift mechanism 124.

Figure 23:
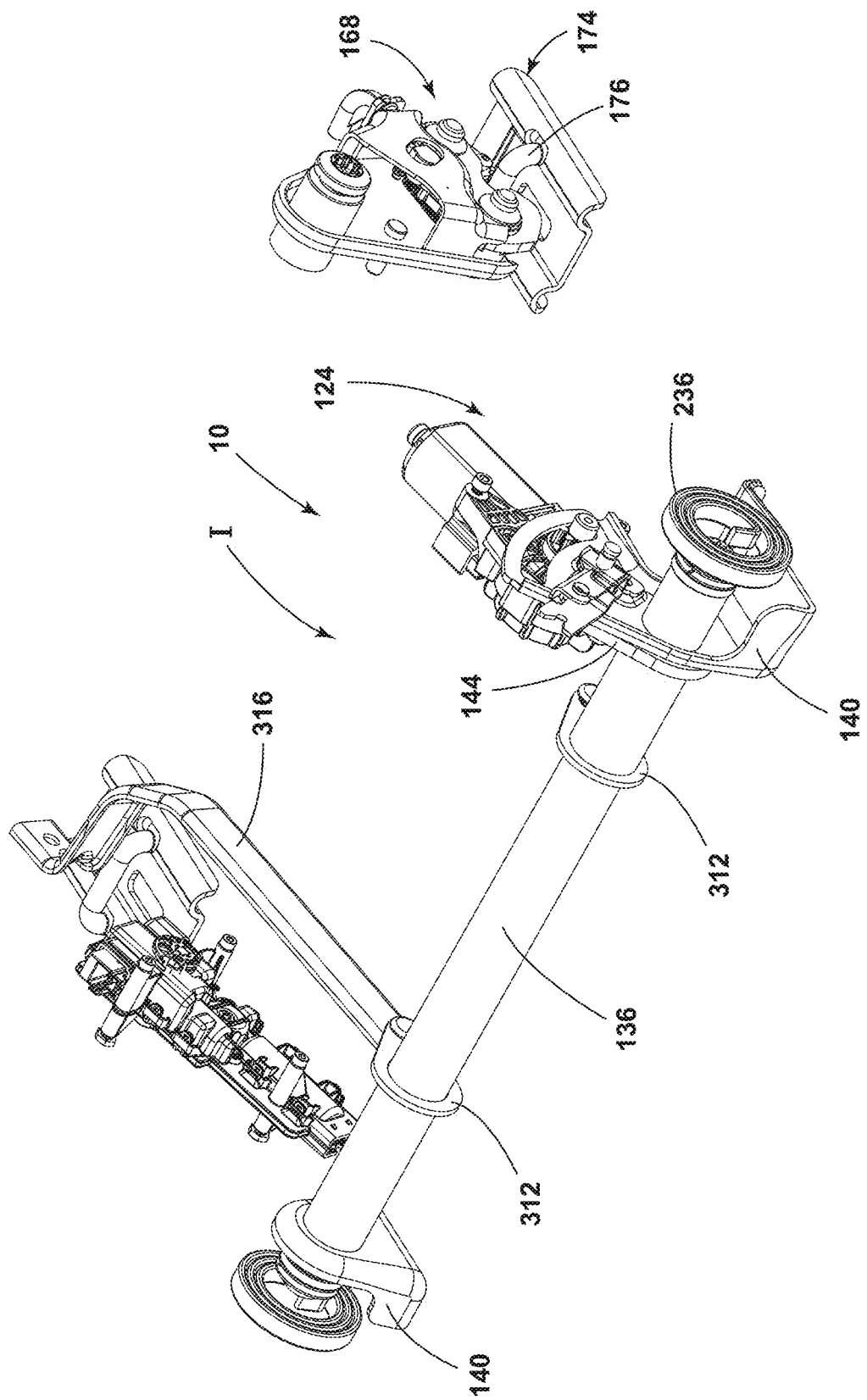
FIG. 23 is a front perspective assembly view of the lift mechanism, the latch mechanism, and the elongated member.

With reference to FIGS. 23-27, additional views of the seating assembly 10 show components of the seating assembly 10. Referring to FIG. 23, parts of the seating assembly 10 as they are arranged when the seating assembly 10 is in the sitting position I are shown. The elongated member 136 may extend between the two mounting brackets 140.

Figure 24:
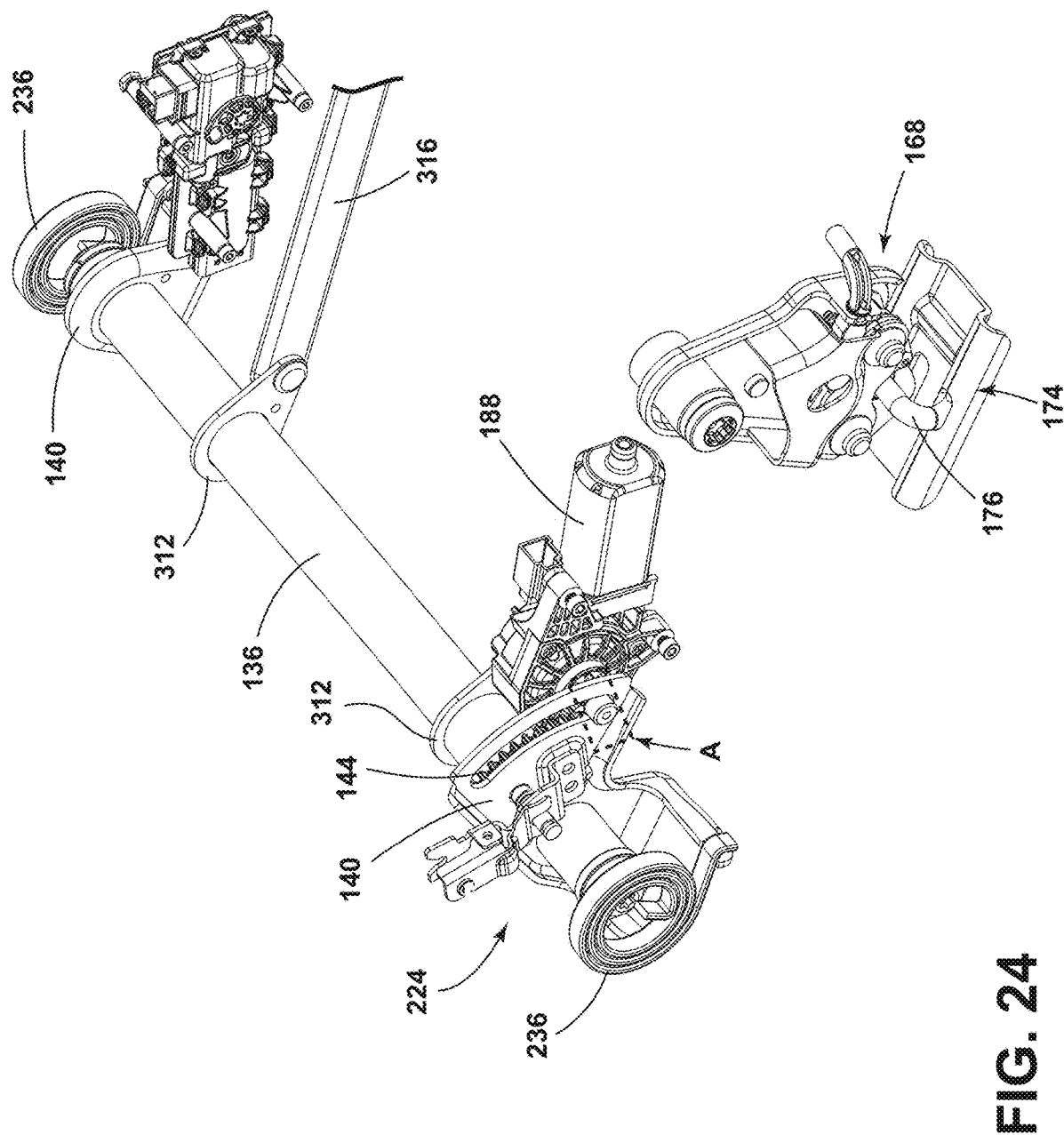
FIG. 24 is a rear perspective assembly view of the lift mechanism, the latch assembly, and the elongated member.

Referring to FIG. 24, another view of the seating assembly 10 parts as they are arranged in the sitting position I is shown. The mounting bracket 140 and the power actuator 188 are shown. The link 316 is shown. A latch assembly 168 and striker 176 are also shown.

Figure 25:
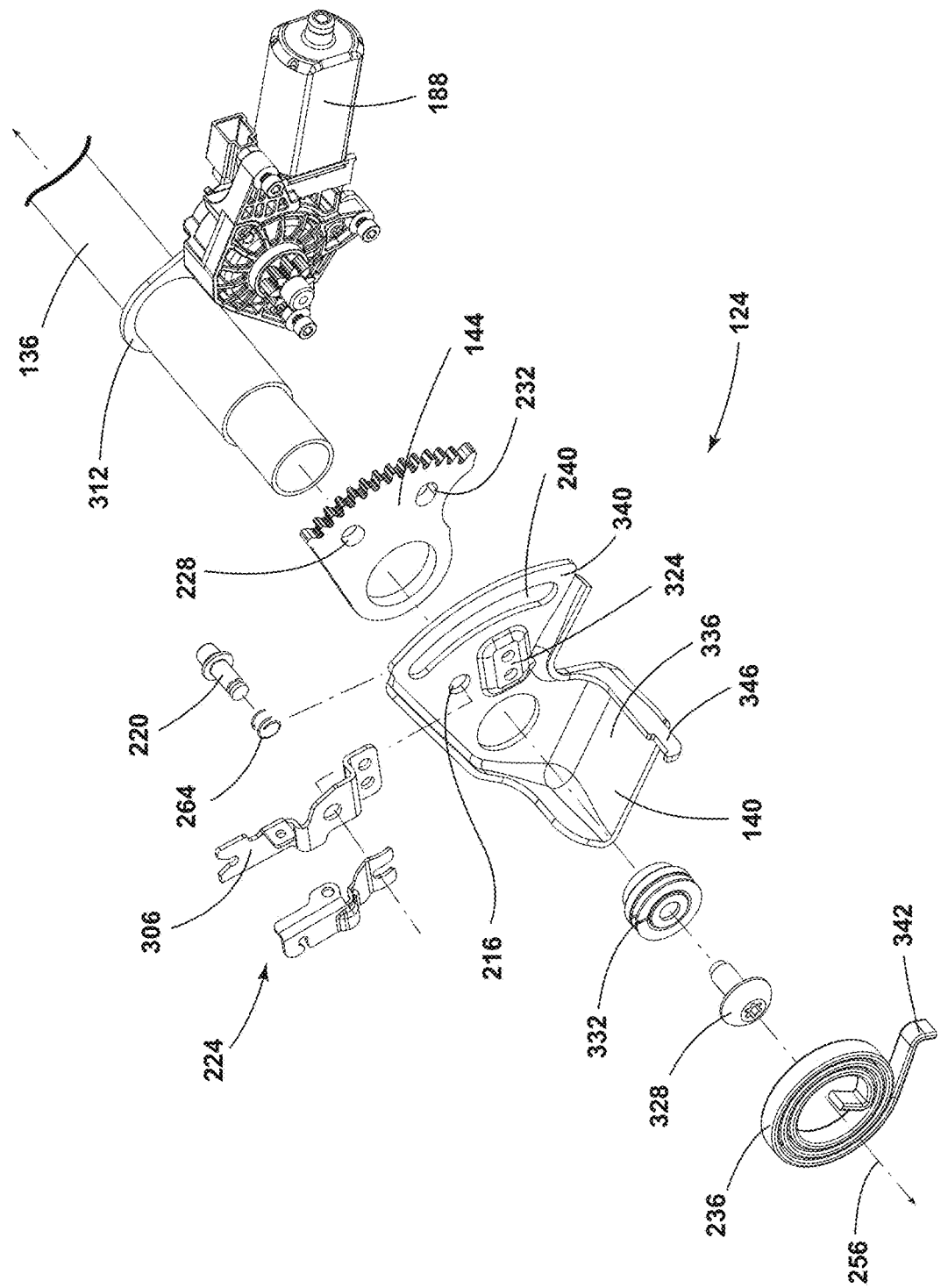
FIG. 25 is an exploded view of the lift mechanism.

Referring now to FIG. 25, an exploded view of the lift mechanism 124 is shown. A fastener (screw 328 in the example shown) and a washer 332 are also shown. The screw 328 and the washer 332 may be used to attach the mounting bracket 140 to the elongated member 136. The mounting bracket 140 may include a flat base portion 336 for securing the mounting bracket 140 to the rail 164, base 42, or other part of the vehicle 18. A flange 340 may extend away from the flat base portion 336. The flange 340 may include the cutaway portion 240 of the mounting bracket 140. The clock spring 236 may include an end 342 that may engage an extension 346 that may extend from the mounting bracket 140.

Figure 26:
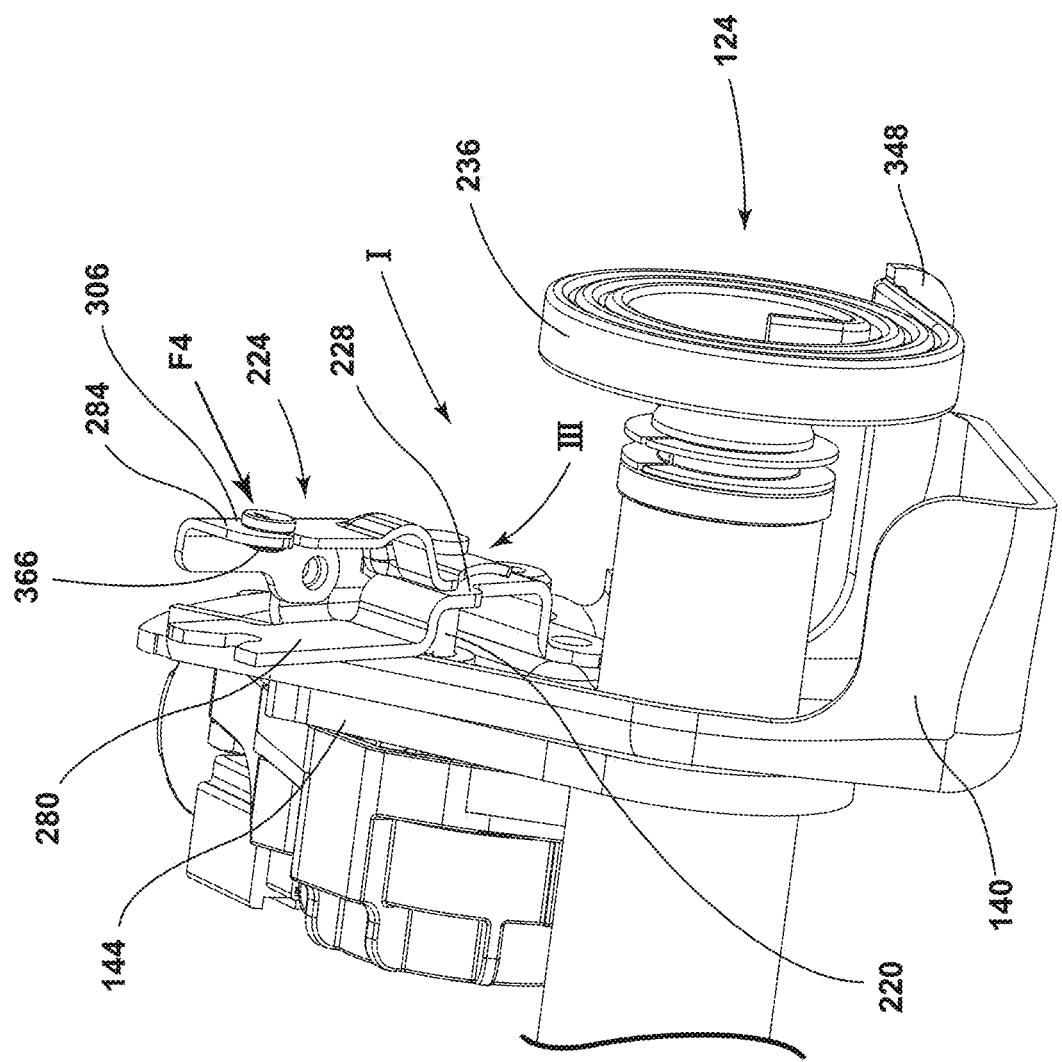
FIG. 26 is a front perspective view of the lift mechanism.

With reference to FIG. 26, the pin 220 is shown in a primary or extended position III of in the sector gear 144. The pin assembly 224 and the pin release lever 306 are shown.

Figure 27:
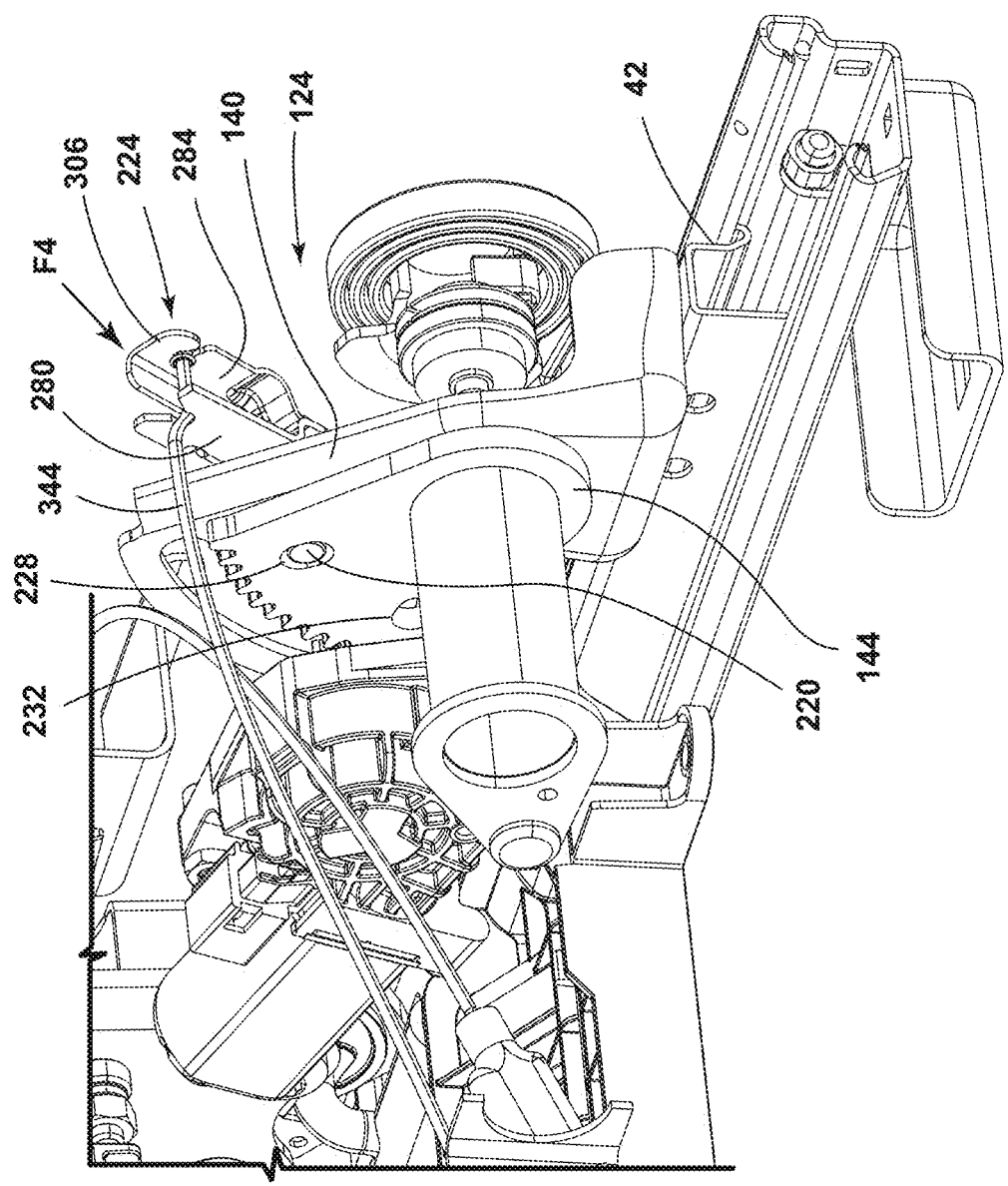
FIG. 27 is a front perspective view of the lift mechanism and a rail.

Referring now to FIG. 27, a perspective view of the lift mechanism 124 is shown. The cable assembly 344 that may exert a force on the pin 220 to move the pin 220 from the primary or extended position III to the secondary or withdrawn position IV is shown. An end of the cable assembly 344 may extend through the first bracket 280 and the second bracket 284 of the pin assembly 224. The cable assembly 344 may include a bushing coupling the cable assembly 344 to the pin release lever 306 of the second bracket 284. When the arm 190 (FIGS. 28-30) is deployed, the cable assembly 344 may exert a force F4 on the pin release lever 306 of the second bracket 284. The force F4 may cause the pin 220 to move from the primary or extended position III (FIG. 17) to the secondary or withdrawn position IV (FIG. 22).

Figure 29:
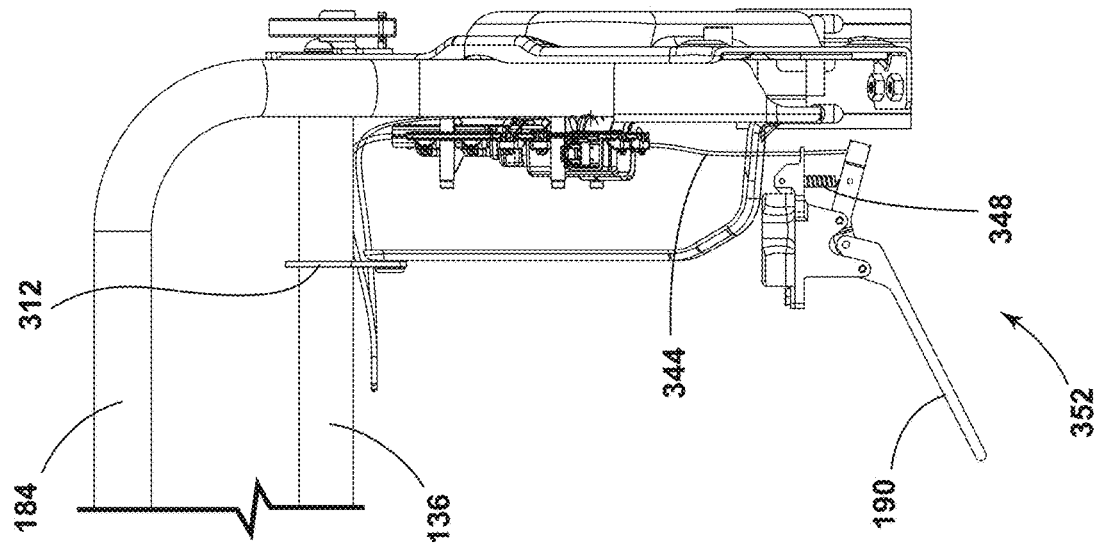
FIG. 29 is a top plan view of the arm assembly when the pin is in a secondary or withdrawn position.
Figure 28:
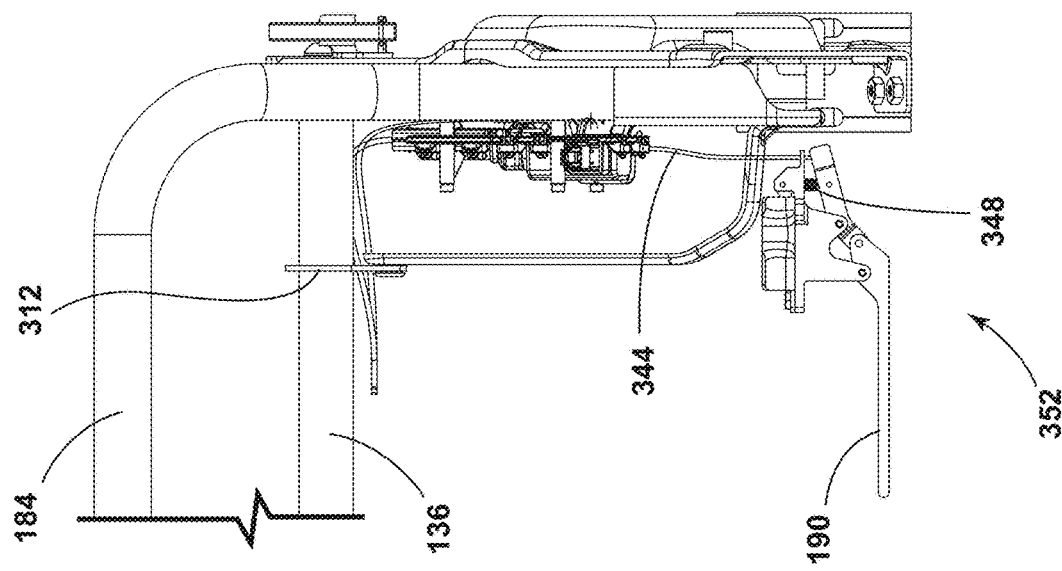
FIG. 28 is a top plan view of the arm assembly when the pin is in a primary or extended position.

Referring to FIGS. 28-29, an arm assembly 352 for manually moving the seating assembly 10 from the sitting position I to the standing position II is shown. The arm assembly 352 may include an arm 190. The arm 190 may be pulled from a rest position (FIG. 28) to a deployed position (FIG. 29) to pull the cable assembly 344. The cable assembly 344 may be connected to the pin release lever 306 of the pin assembly 224. A biasing member (spring 348) is shown disposed in the arm assembly 352 to help the passenger 12 exert enough force on the arm 190 to move the pin 220 from the primary or extended position III to the secondary or withdrawn position IV. Movement of the pin 220 from the primary or extended position III to the secondary or withdrawn position IV may allow the sector gear 144 to rotate relative to the mounting bracket 140 and around the elongated member 136. As such, the arm 190 may be moved from the rest position (FIG. 28) to the deployed position (FIG. 29) during manual actuation for moving the vehicle seating assembly 10 from the sitting position I to the standing position II.

Figure 30:
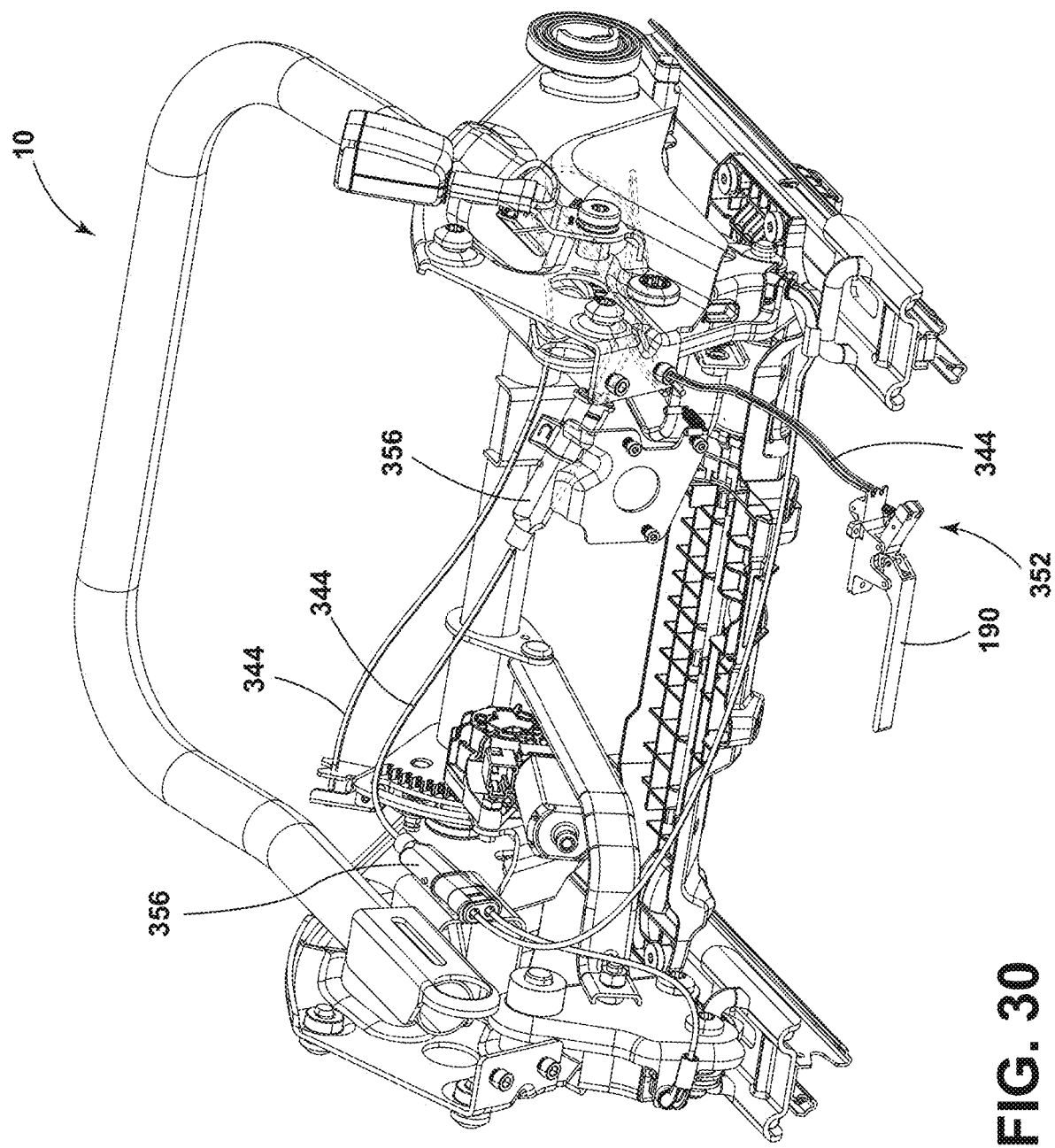
FIG. 30 is a side perspective view of the cable assemblies in the seat for operating the latch assemblies and the pin assembly.
Figure 31:
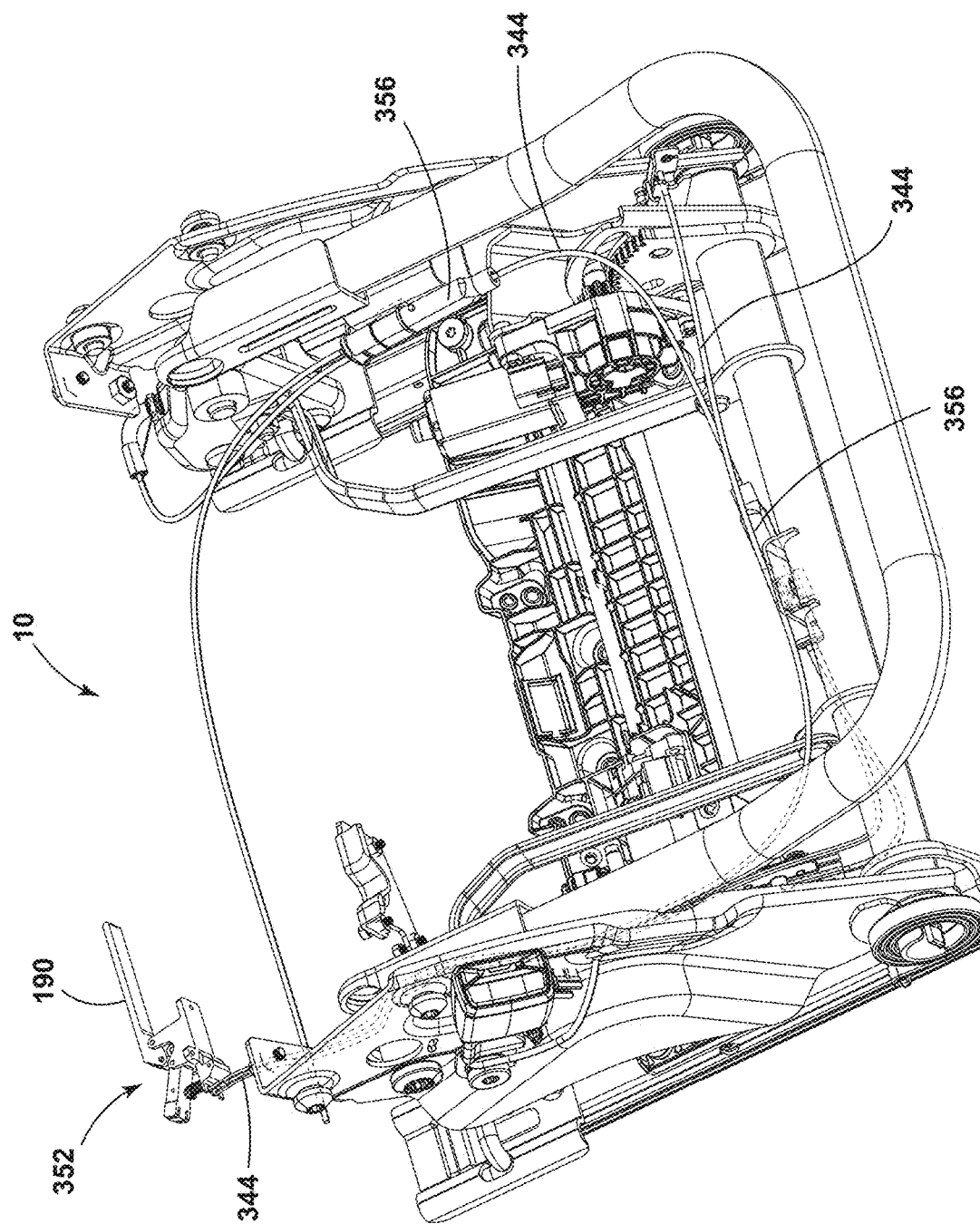
FIG. 31 is a top perspective view of the cable assemblies in the seat for operating the latch mechanisms and the pin assembly.
Figure 32:
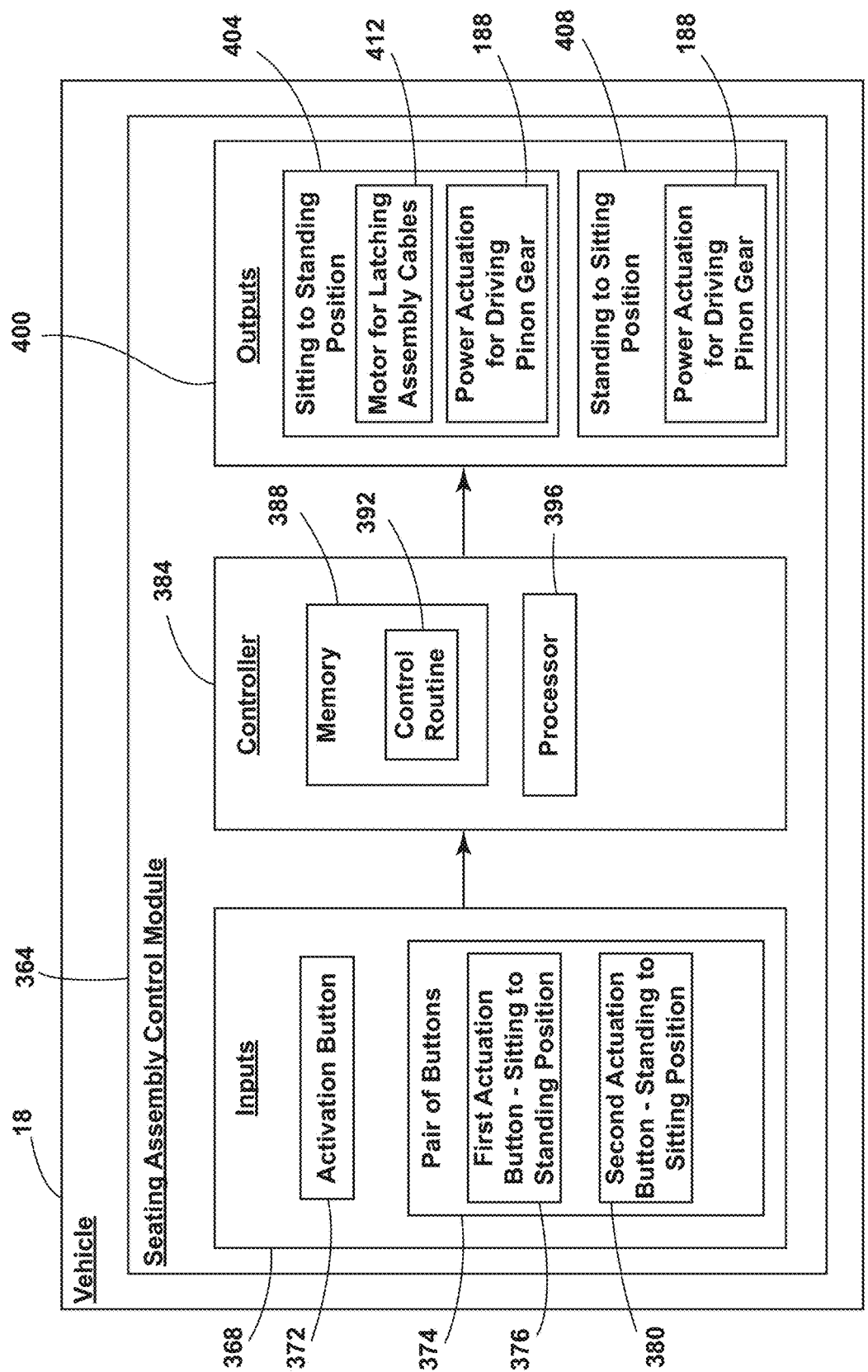
FIG. 32 is a block diagram of a seating assembly control module.

Referring to FIGS. 30-32, cable assemblies 344 disposed within the vehicle seating assembly 10 and a block diagram of the seating assembly control module 364 show how movement of the vehicle seating assembly 10 from the sitting position I to the standing position II takes place in response to an actuation (manual or power) by a passenger 12. With reference to FIGS. 30-31, cable assemblies 344 are shown disposed within the seating assemblies 10. The cable assemblies 344 may be connected to an arm assembly 352 (FIGS. 28-29). As previous explained, during manual actuation of the lift mechanism 124 to move the seating assembly 10 from the sitting position I to the standing position II, a passenger 12 may pull an arm 190 to pull the cable assemblies 344 to cause the latch assemblies 168 to release the strikers 176 and to move the pin 220 from the primary or inserted position III to the secondary or withdrawn position IV respective to the hole 228 of the sector gear 144. Thereafter, the passenger 12 may exert the force F1 (FIG. 18) on the seating assembly 10 to move the seating assembly 10 to the standing position II. The biasing member (clock springs 236) may help the passenger 12 move the seating assembly 10 from the sitting position I to the standing position II. When the seating assembly 10 reaches the standing position II, the pin 220 may move from the secondary or withdrawn position IV to the primary or inserted position III relative to the hole 232 of the sector gear 144. As such, manual actuation of the movement of the seating assembly 10 from the sitting position I to the standing position II may take place.

It is contemplated that the sector gear 144 may be designed to include intermittent holes between the hole 228 and the hole 232 such that the pin 220 may be placed in an intermittent hole in the extended or secondary position IV to manually secure the sector gear 144 to the mounting bracket 140. As such, the passenger 12 may manually position the seating assembly 10 in an intermittent position between the sitting position I and the standing position II.

With reference to FIGS. 30-31, the cable assemblies 344 may include electric cable actuators 356 disposed in the cable assemblies 344. The electric cable actuators 356 may be used during power actuation for movement of the seating assembly 10 between the sitting position I and the standing position II.

With reference to FIG. 32, an example of a block diagram of a vehicle 18 including a seating assembly control module 364 is shown to illustrate power actuation of the seating assembly 10. The seating assembly control module 364 may include inputs 368. The inputs 368 may include a separate activation button 372 that may move the seating assembly 10 between the sitting position I, the standing position II, and intermittent positions therebetween. The inputs 368 may also include a pair of actuation buttons 374 that may include a first actuation button 376 and a second actuation button 380. The first actuation button 376 may move the seating assembly 10 from the sitting position I to the standing position II. The second actuation button 380 may move the seating assembly 10 from the standing position II to the sitting position I. A controller 384 may receive the inputs 368. The controller 384 may include a memory 388 having a control routine 392. A processor 396 may execute the control routine 392. The controller 384 may generate the outputs 400. The outputs 400 may include an output 404 for moving the seating assembly 10 from the sitting position I to the standing position II and an output 408 for moving the seating assembly 10 from the standing position II to the sitting position I. The output 404 for moving the seating assembly 10 from the sitting position I to the standing position II may include a motor 412 for latch assembly cable assemblies 344 and a power actuator 188 for driving a pinion gear 148. The output 408 for moving the seating assembly 10 from the standing position II to the sitting position I may include a power actuator 188 for moving a pinion gear 148. As such, powered components are used during power actuation of a seating assembly 10 from the sitting position I to the standing position II.

Figure 33:
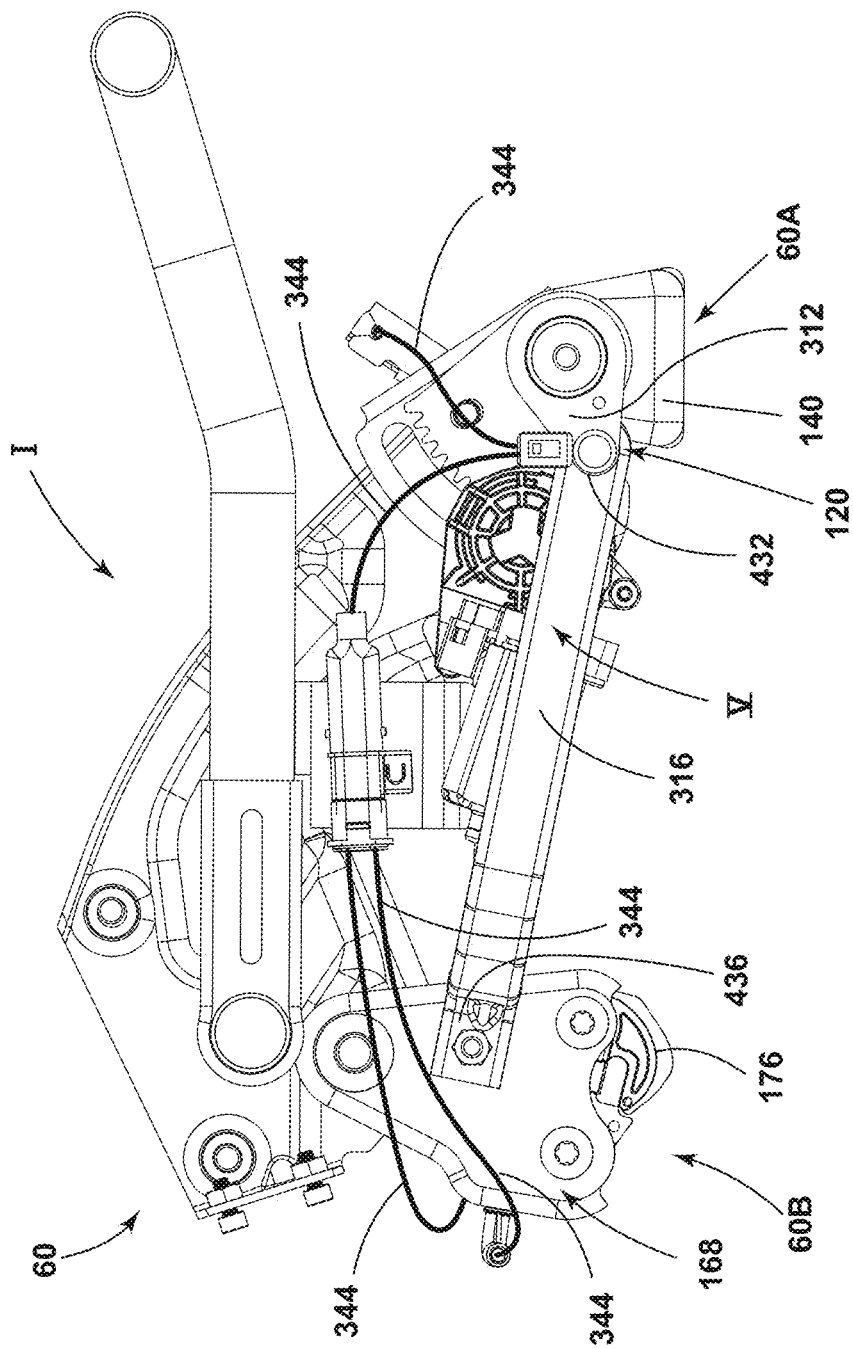
FIG. 33 is a cross-sectional view of parts of the seat including cable assemblies for operating the latch mechanisms and the pin assembly
Figure 34:
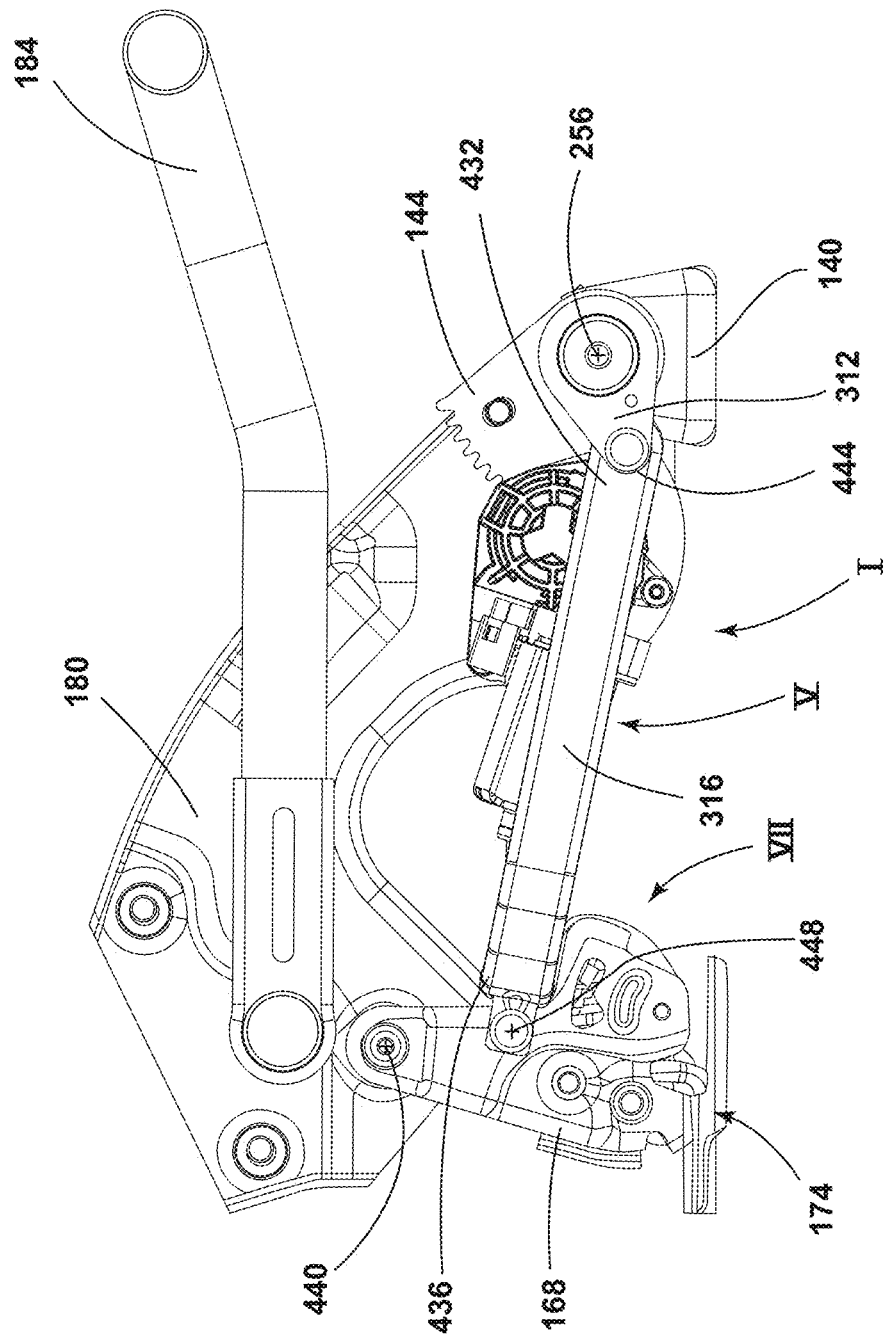
FIG. 34 is a cross-sectional view of parts of the seat and the mounting assembly showing the link in an initial position, the latch assemblies in an untucked position, and the seat in a sitting position.
Figure 35:
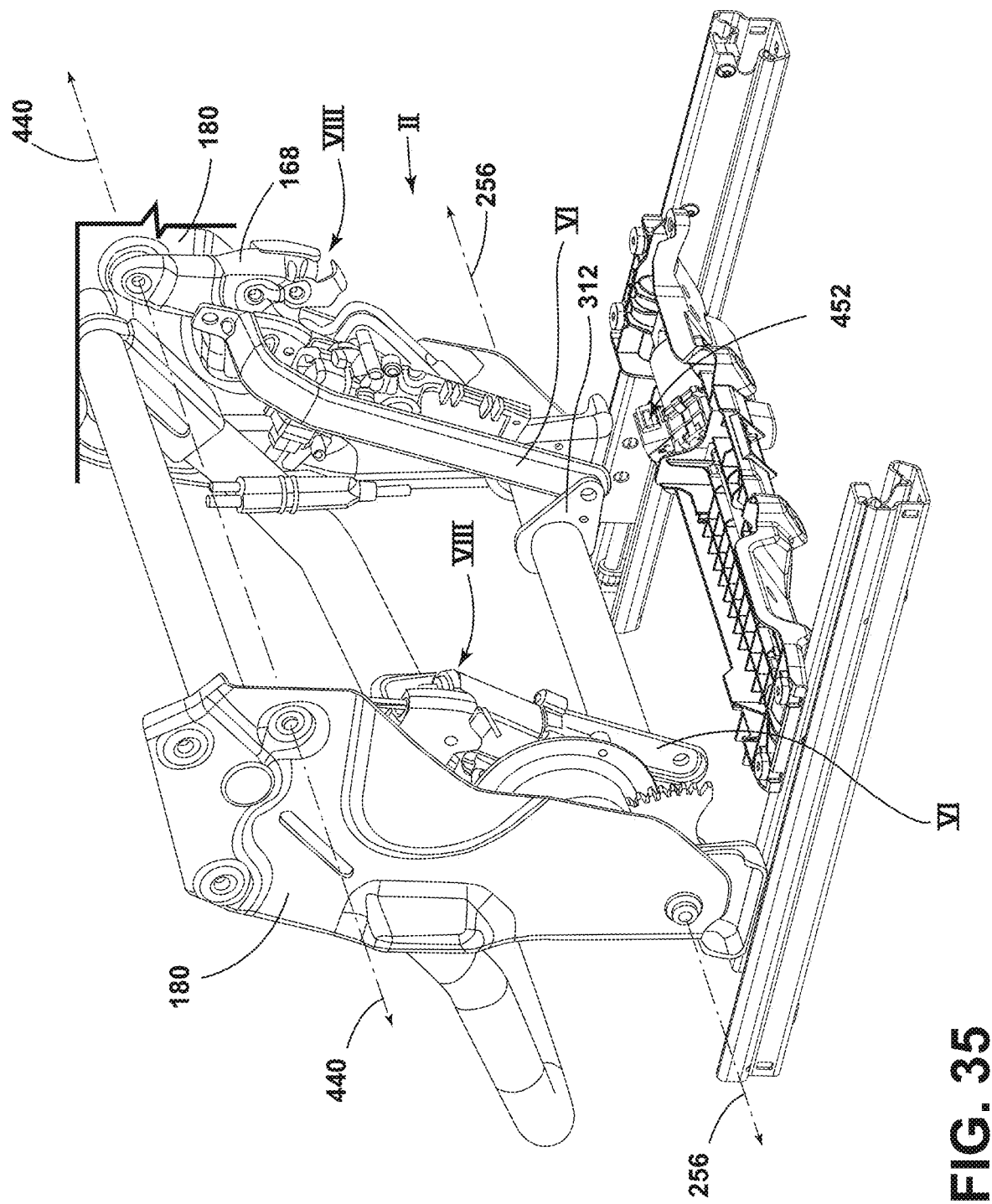
FIG. 35 is a perspective view of parts of the seat disposed on rails showing the link in a final position, the latch assemblies in a tucked position, and the seat in a standing position.

Referring to FIGS. 33-35, the link 316 for tucking the latch assemblies 168 under the side brackets 180 as the vehicle seating assembly 10 is moved from the sitting position I to the standing position II is shown. The link 316 may include a first end 432 and a second end 436. A first end 432 of the link 316 may be pivotably coupled to the elongated member 136 disposed at the forward portion 60A of the seat 60 with pivotable couplings 120. The second end 436 of the link 316 may be pivotably coupled to the latch assemblies 168 disposed at the rear portion 60B of the seat 60. The latch assemblies 168 may be coupled to the opposing side brackets 180 on both sides of the seat frame 160. The latch assemblies 168 may include latching claws 172 that may be secured to the base 42 in the sitting position I of the seating assembly 10. The latch assemblies 168 may be detached from the base 42 of the seating assembly 10 to move the seating assembly 10 from the sitting position I to the standing position II. Power actuation or manual actuation of the seating assembly 10 may result in the latch assemblies 168 being detached from the base 42 of the seating assembly 10 so that the seating assembly 10 may move from the sitting position I to the standing position II. Displacement of the vehicle seating assembly 10 from the sitting position I to the standing position II may cause the latch assemblies 168 to rotate from a first position substantially transverse to the side brackets 180 of the seat frame 160 (untucked position VII) to a second position substantially aligned with the side brackets 180 of the seat frame 160 (tucked position VIII). The link 316 may move from an initial position V when the seat 60 is in the sitting position I to a final position VI when the seat 60 is in the standing position II. The first end 432 of the link 316 may be rotatably coupled to the elongated member 136 extending across the forward portion 60A of the seat 60. The elongated member 136 may extend between opposing mounting brackets 140 disposed on the base 42. The first end 432 of the link 316 may be coupled to a linkage 312 that may be rotatably coupled to the elongated member 136. The second end 436 of the link 316 may be rotatably coupled to the latch assembly 168.

Referring again to FIGS. 33-35, when the vehicle seating assembly 10 is in the sitting position I, the initial position V of the link 316 may be defined by the link 316 extending along the floor panel 46. When the vehicle seating assembly 10 is in the standing position II, the final position VI of the link 316 may be defined by the link 316 extending away from the floor panel 46.

With reference to FIGS. 1-35, a link 316 for a vehicle seating assembly 10 includes a first end 432 rotatably coupled to an axis 256 extending through a side bracket 180 of a seat 60 proximate a forward portion 60A of the seat 60. The link 316 may also include a second end 436 rotatably coupled to an axis 440 extending through a latch assembly 168 proximate a rear portion 60B of the seat 60. The link 316 moves a latch assembly 168 from an untucked position VII to a tucked position VIII as the seat 60 moves from a respective sitting position I to a standing position II. In one example, the first axis includes the lift mechanism axis 256. In one example, the axis 440 is defined by a pivotable coupling between the latch assembly 168 and the side bracket 180.

Referring again to FIGS. 1-35, the vehicle seating assembly 10 may also include a linkage 312 rotatable about an elongated member 136 extending from the lift mechanism 124 along the axis 256, wherein the first end 432 of the link 316 is pivotably coupled to the linkage 312. The vehicle seating assembly 10 may also include a pivotable coupling on the latch assembly 168, wherein the second end 436 of the link 316 is pivotably coupled to the pivotable coupling on the latch assembly 168. The link 316 may be bent such that the link 316 curves inward toward the seat 60.

With reference to FIGS. 1-35, a link 316 for a vehicle seating assembly 10 includes a first end 432 rotatably coupled to a lift mechanism 124 disposed at a forward portion 60A of the seat 60. The second end 436 is rotatably coupled to a latch assembly 168 disposed at a rear portion 60B of the seat 60. The lift mechanism 124 is pivotably coupled to a mounting bracket 140 that is fixedly coupled to a base 42. The latch assembly 168 is rotatably coupled to a side bracket 180 of the seat 60. The link 316 rotates the latch assembly 168 from an untucked position VII when the seat 60 is in the sitting position I to a tucked position VIII when the seat 60 is in the standing position II. In the untucked position VII, the latch assembly 168 may be substantially transverse to the side bracket 180. In the tucked position VIII, the latch assembly 168 may be disposed along the side bracket 180.

The links 316 and the latch assemblies 168 may move with a lift motion (arrow 206) and a tuck motion (arrow 207) (FIG. 7). The lift motion (arrow 206) may allow the links 316 and the latch assemblies 168 to lift upward with the seating assembly 10, and the tuck motion (arrow 207) may allow the links 316 and the latch assemblies 168 to tuck under the seating assembly 10. As such, the links 316 and the latch assemblies 168 may be positioned to minimize interference with the egress and ingress of a passenger 12 relative to a vehicle 18.

A variety of advantages may be derived from the present disclosure. A passenger 12 may conveniently move a seating assembly 10 between a sitting position I and a standing position II by using a power actuator 188. The passenger 12 may also conveniently move the seating assembly 10 between a sitting position I and a standing position II by using manual actuation that includes a biasing member (clock spring 236) to make the manual actuation process easier. The seating assembly 10 may include a link 316 that may be stored in the contour of the side brackets 180 when the seating assembly 10 is in the standing position II.

The pivotable seating assembly is also disclosed in co-pending, commonly assigned to Ford Global Technologies, LLC, patent application docket number 16/704081, entitled SEATING ASSEMBLY, the entire disclosure of which is hereby incorporated herein by reference.

It is to be understood that variations and modifications can be made on the aforementioned structure without departing from the concepts of the present disclosure, and further it is to be understood that such concepts are intended to be covered by the following claims, unless these claims, by their language, expressly state otherwise.

What is claimed is:

1. A vehicle seating assembly, comprising:
  a lift mechanism disposed at a forward portion of a seat;
  a latch assembly disposed at a rearward portion of the seat and rotatably coupled to the seat;
  a mechanical link having a first end rotatably coupled to the forward portion of the seat and a second end rotatably coupled to the latch assembly; and
  wherein the vehicle seating assembly is movable between a first position and a second position, wherein the latch assembly is positionable in a latched position or an unlatched position relative to a mount assembly, wherein the mechanical link is disposed in an initial position when the seating assembly is in the first position, wherein the mechanical link is disposed in a final position when the seating assembly is in the second position, wherein the first end of the mechanical link is rotatably coupled to an elongated member extending across the forward portion of the seat, wherein the elongated member extends between opposing mounting brackets disposed on a base of the vehicle seating assembly, wherein the lift mechanism is coupled to a mounting bracket, and wherein the first end of the mechanical link is coupled to a linkage that is rotatably coupled to the elongated member.

2. The vehicle seating assembly of claim 1, wherein the seat comprises a side bracket, and wherein the latch assembly is rotatably coupled to the side bracket.

3. The vehicle seating assembly of claim 1, wherein the first position includes a sitting position, and wherein the second position includes a standing position.

4. The vehicle seating assembly of claim 3, wherein when the vehicle seating assembly is in the sitting position, the initial position of the mechanical link may be defined by the link extending along the base.

5. The vehicle seating assembly of claim 4, wherein when the vehicle seating assembly is in the standing position, the final position of the mechanical link may be defined by the link extending away from the base.

6. The vehicle seating assembly of claim 1, wherein the mounting assembly includes a striker.

7. The vehicle seating assembly of claim 6, wherein the latch assembly includes a latching claw.

8. A link for a vehicle seating assembly, comprising:
  a first end rotatably coupled to a first axis extending through a side bracket of a seat proximate a forward portion of the seat; and
  a second end rotatably coupled to a second axis extending through a latch assembly proximate a rear portion of the seat, wherein the link moves the latch assembly from an untucked position to a tucked position as the seat moves from a respective sitting position to a standing position, wherein in the untucked position, the latch assembly is substantially transverse to the side bracket, and wherein in the tucked position, the latch assembly is disposed along the side bracket.

9. The vehicle seating assembly of claim 8, wherein the first axis includes a lift mechanism axis.

10. A link for a vehicle seating assembly, comprising:
a first end rotatably coupled to a first axis extending through a side bracket of a seat proximate a forward portion of the seat; and
a second end rotatably coupled to a second axis extending through a latch assembly proximate a rear portion of the seat, wherein the link moves the latch assembly from an untucked position to a tucked position as the seat moves from a respective sitting position to a standing position, wherein the first axis includes a lift mechanism axis, and wherein the second axis is defined by a pivotable coupling between the latch assembly and the side bracket.

11. The vehicle seating assembly of claim 10, further comprising:
a linkage rotatable about an elongated member extending from the lift mechanism along the first axis, wherein the first end of the link is pivotably coupled to the linkage.

12. The vehicle seating assembly of claim 11, further comprising:
a pivotable coupling on the latch assembly, wherein the second end of the link is pivotably coupled to the pivotable coupling on the latch assembly.

13. The vehicle seating assembly of claim 12, wherein the link is curved such that the first end is inward towards the seat of the second end.

* * * * *